United States Patent
Miyata et al.

(10) Patent No.: US 9,779,341 B2
(45) Date of Patent: Oct. 3, 2017

(54) DATA COMMUNICATION SYSTEM, DATA TRANSMISSION APPARATUS, AND DATA RECEPTION APPARATUS

(71) Applicant: CANON KABUSHIKI KAISHA, Tokyo (JP)

(72) Inventors: Yohei Miyata, Kawasaki (JP); Yusuke Komano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/139,677

(22) Filed: Apr. 27, 2016

(65) Prior Publication Data
US 2016/0342869 A1 Nov. 24, 2016

(30) Foreign Application Priority Data

May 18, 2015 (JP) .................. 2015-101332

(51) Int. Cl.
H04N 1/04 (2006.01)
G06K 15/00 (2006.01)
G06F 11/10 (2006.01)
H04L 1/00 (2006.01)

(52) U.S. Cl.
CPC ........ *G06K 15/408* (2013.01); *G06F 11/1004* (2013.01); *H04L 1/0041* (2013.01); *H04L 1/0056* (2013.01); *H04L 1/0061* (2013.01)

(58) Field of Classification Search
CPC .... H04L 1/0041; H04L 1/0056; H04L 1/0061
USPC ........................ 358/1.14, 1.15, 1.9
See application file for complete search history.

(56) References Cited

U.S. PATENT DOCUMENTS

| 7,694,204 | B2 | 4/2010 | Schmidt et al. ............... 714/758 |
| 7,937,644 | B2 | 5/2011 | Schmidt et al. ............... 714/758 |
| 8,099,648 | B2 | 1/2012 | Schmidt et al. ............... 714/758 |
| 9,143,267 | B2 * | 9/2015 | Ma ........................ H04L 1/0009 |
| 2011/0209027 | A1 | 8/2011 | Schmidt et al. ............... 714/752 |
| 2016/0085619 | A1 * | 3/2016 | Iyer ..................... G06F 11/1004 714/807 |

FOREIGN PATENT DOCUMENTS

JP 2007-267392 10/2007

\* cited by examiner

*Primary Examiner* — Houshang Safaipour
(74) *Attorney, Agent, or Firm* — Fitzpatrick, Cella, Harper & Scinto

(57) ABSTRACT

A control unit of a printing apparatus includes a data transfer unit forming a first error detection code generation unit and a second error detection code generation unit. A printhead of the printing apparatus includes an error detection unit including a first data reception unit for performing error detection based on a first error detection code and transfer data synchronized with a leading edge, and a second data reception unit for performing error detection based on a second error detection code and the transfer data synchronized with a trailing edge.

16 Claims, 17 Drawing Sheets

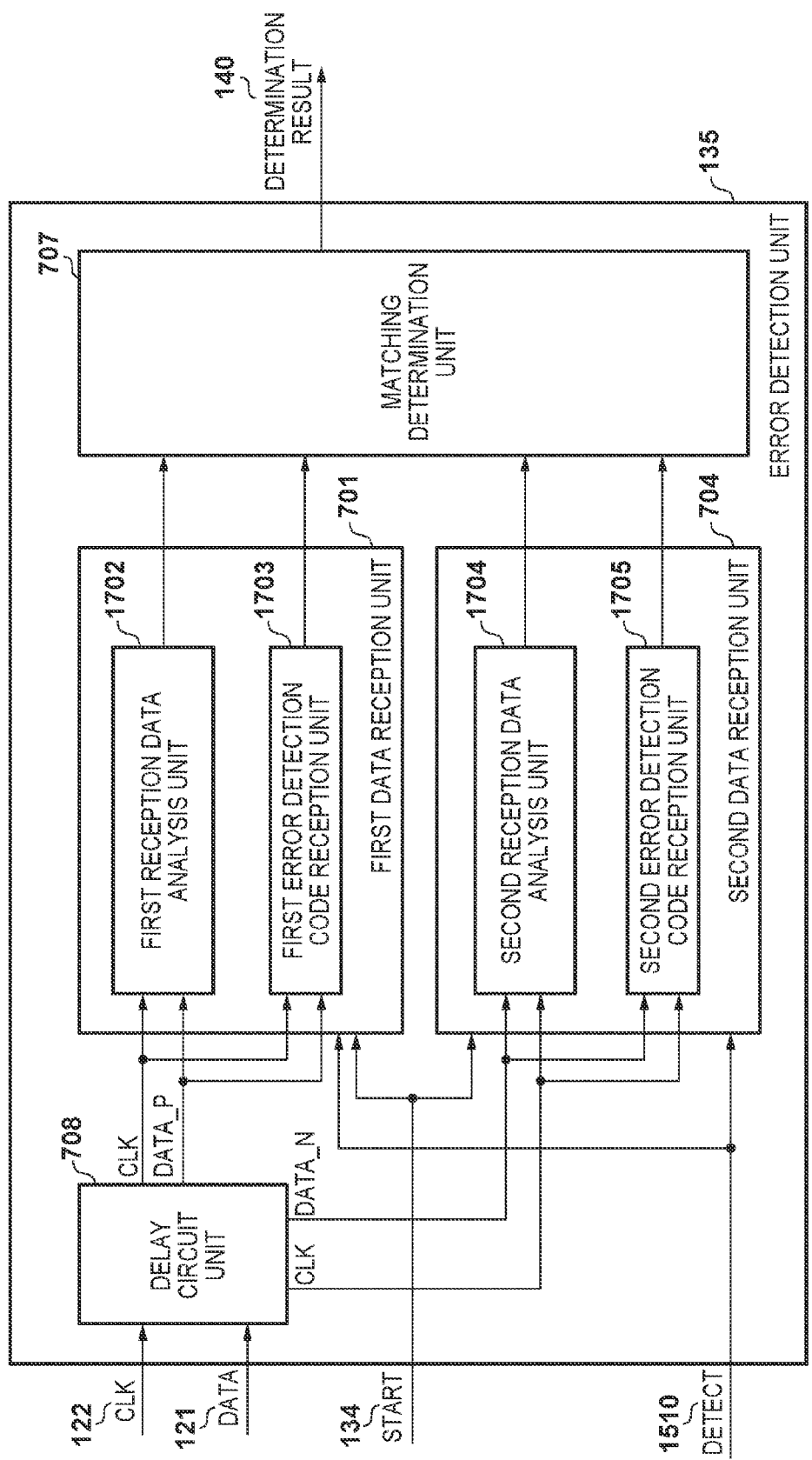

DATA COMMUNICATION SYSTEM, DATA TRANSMISSION APPARATUS, AND DATA RECEPTION APPARATUS

BACKGROUND OF THE INVENTION

Field of the Invention

The present invention relates to an error detection apparatus for clock-synchronized serial communication and, more particularly, to a data communication system between a control unit and printhead of an inkjet printing apparatus or the like, a data transmission apparatus, and a data reception apparatus.

Description of the Related Art

An inkjet printing apparatus has used clock-synchronized serial communication for communication between a control device and a printhead. The size of discharge nozzles in the printhead has been decreased to improve the printing quality, and the transfer data rate of communication has been increased to increase the printing speed. A transfer clock frequency increases in proportion to the transfer data rate. This may impose a problem associated with radiation noise in a transmission line. Low voltage differential signaling (LVDS) is effective to suppress radiation noise. However, LVDS is readily influenced by ambient noise, thereby readily causing a bit error in the transmission line. Bit error detection is performed in the printhead for more reliable data transfer. However, it is common practice to add an error detection bit (for example, a parity bit or CRC detection bit) to transfer data for error detection, and thus the data transfer efficiency deteriorates in accordance with the added bit, and the effective rate of data transfer decreases. Japanese Patent Laid-Open No. 2007-267392 discloses an apparatus and method in which an error detector and a decoder for decoding encoded data bits are arranged in a physical layer and an error detection code is efficiently transferred in point-to-point communication between integrated circuits. Japanese Patent Laid-Open No. 2007-267392 has as its object to implement reliable data communication between electronic apparatuses by this transfer operation.

Encoding described in Japanese Patent Laid-Open No. 2007-267392 is generally known as 8B/10B, and a clock is embedded in an encoded data bit group. Thus, the decoder has a relatively large circuit scale. Consequently, it is difficult to apply the technique described in Japanese Patent Laid-Open No. 2007-267392 to a device formed by a small-scale circuit like the printhead in the inkjet printing apparatus.

SUMMARY OF THE INVENTION

The present invention has been made in consideration of the above conventional example, and provides a data communication system capable of performing error detection while suppressing an increase in circuit scale without decreasing the effective rate of data transfer, a printing apparatus using the data communication system, a printhead, a data transmission apparatus, a data reception apparatus, a control method of the data communication system.

The present invention has the following arrangement. According to the first aspect of the present invention, there is provided a data communication system for transmitting serial data from a data transmission unit to a data reception unit, the data transmission unit comprising a first error detection code generation unit configured to generate a first error detection code based on odd-numbered bits corresponding to odd-numbered digits of transfer data, a second error detection code generation unit configured to generate a second error detection code based on even-numbered bits corresponding to even-numbered digits of the transfer data, and a transmission unit configured to transmit the first error detection code, the second error detection code, and the transfer data to the data reception unit, and the data reception unit comprising a reception unit configured to receive the transfer data, the first error detection code, and the second error detection code, and an error detection unit configured to detect an error based on each of a group of the odd-numbered bits of the transfer data and the first error detection code and a group of the even-numbered bits of the transfer data and the second error detection code.

According to the second aspect of the present invention, there is provided a data reception apparatus for receiving data from a data transmission unit including a first error detection code generation unit configured to generate a first error detection code based on odd-numbered bits corresponding to odd-numbered digits of transfer data, a second error detection code generation unit configured to generate a second error detection code based on even-numbered bits corresponding to even-numbered digits of the transfer data, and a transmission unit configured to transmit serial data containing the first error detection code, the second error detection code, and the transfer data, the apparatus comprising: a reception unit configured to receive the transfer data, the first error detection code, and the second error detection code, and an error detection unit configured to detect an error based on each of a group of the odd-numbered bits of the transfer data and the first error detection code and a group of the even-numbered bits of the transfer data and the second error detection code.

According to the third aspect of the present invention, there is provided a data transmission apparatus for transmitting serial data to a data reception unit including a reception unit configured to receive transfer data, a first error detection code, and a second error detection code, and an error detection unit configured to detect an error based on each of a group of odd-numbered bits corresponding to odd-numbered digits of the transfer data and the first error detection code and a group of even-numbered bits corresponding to even-numbered digits of the transfer data and the second error detection code, the apparatus comprising: a first error detection code generation unit configured to generate the first error detection code based on the odd-numbered bits of the transfer data; a second error detection code generation unit configured to generate the second error detection code based on the even-numbered bits of the transfer data; and a transmission unit configured to transmit the first error detection code, the second error detection code, and the transfer data to the data reception unit.

According to the present invention, it is possible to implement an error detection code by a relatively small-scale circuit arrangement without increasing the frequency of a transfer clock or decreasing the effective rate.

Further features of the present invention will become apparent from the following description of exemplary embodiments with reference to the attached drawings.

BRIEF DESCRIPTION OF THE DRAWINGS

FIG. 17 is a block diagram for explaining an error detection unit according to the third embodiment.

DESCRIPTION OF THE EMBODIMENTS

First Embodiment

<Inkjet Printing Apparatus>

Figure 1:
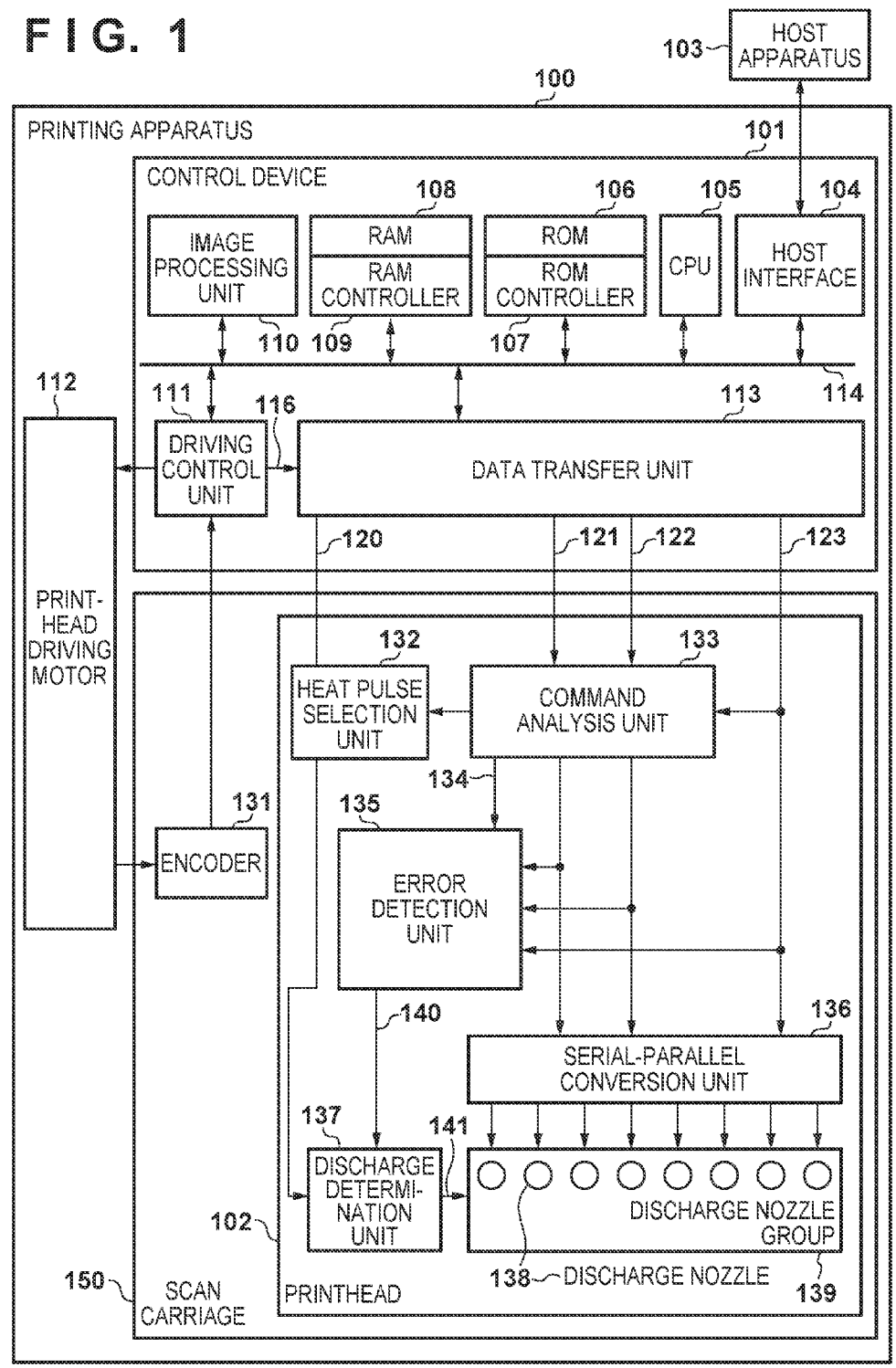
FIG. 1 is a block diagram for explaining a printing apparatus.

An embodiment of the present invention will be schematically described with reference to FIG. 1. The embodiment to be described below will exemplify a printing apparatus 100 using a printhead complying with an inkjet method. In this specification, the term "printing" (to also be referred to as "print" hereinafter) not only includes the formation of significant information such as characters and graphics, but also broadly includes the formation of images, figures, patterns, and the like on a printing medium, or the processing of the medium, regardless of whether they are significant or insignificant and whether they are so visualized as to be visually perceivable by humans. Furthermore, the term "printing medium" not only includes paper used in common printing apparatuses, but also broadly includes materials, such as cloth, a plastic film, a metal plate, glass, ceramics, wood, and leather, capable of accepting ink. In addition, the term "ink" (to also be referred to as a "liquid" hereinafter) should be extensively interpreted similarly to the definition of "printing (print)" described above. That is, "ink" includes a liquid which, when applied onto a printing medium, can form images, figures, patterns, and the like, can process the printing medium, or can process ink (for example, solidify or insolubilize a coloring agent contained in ink applied to the printing medium). Further, the term "printing element" generically means an orifice or a fluid channel communicating with it, and an element which generates energy used to discharge ink, unless otherwise specified.

The printing apparatus 100 is formed by a printhead 102 for discharging ink and a control device 101 for controlling the printhead. The printing apparatus 100 can be regarded as a data communication system including a data transmission unit in the control device 101 and including a data reception unit in the printhead by paying attention to data communication, as will be described in detail later.

At the start of printing, reception data is input from a host apparatus 103 to the printing apparatus 100 via a host interface 104, and stored in the reception buffer of a RAM 108 via a RAM controller 109. Note that respective blocks in the control device 101 are interconnected via a bus 114. A CPU 105 expands the reception data stored in the reception buffer into image data and a print command, and stores the image data in the image data buffer of the RAM 108. The CPU 105 determines conveyance control information (for example, a pass count and paper conveyance count) of the printhead based on the print command, and notifies a driving control unit 111 of it. The CPU 105 sends an image processing start notification to an image processing unit 110. Upon receiving the image processing start notification, the image processing unit 110 acquires the image data from the image data buffer of the RAM 108, generates binary print data from the image data, stores the generated print data in the print data buffer of the RAM 108, and sends an end notification to the CPU 105. Upon receiving the end notification, the CPU 105 sends a head driving start notification to the driving control unit 111. The driving control unit 111 executes conveyance control of a printing medium and a scan carriage 150 including the printhead based on the conveyance control information of the printhead 102 by inputting a control signal to, for example, a driving system motor such as a printhead driving motor 112. An encoder 131 outputs conveyance position information corresponding to the position of the scan carriage 150 driven by the printhead driving motor 112. The driving control unit 111 acquires the conveyance position information from the encoder 131 in the scan carriage 150, and transmits a printing timing signal 116 to a data transfer unit 113. The data transfer unit 113 serving as a data transmission unit reads out the print data from the print data buffer of the RAM 108 in synchronism with the printing timing signal 116, and generates an error detection code. The data transfer unit 113 also generates a heat pulse signal indicating a discharge timing, serial transfer data (including the print data and error detection code), a synchronization clock, and a latch signal for serial-parallel conversion, and transfers them to the printhead 102 via transmission lines 120 to 123, respectively. In this embodiment, for the sake of consistent description, the serial data is transferred via the transmission line 121, the synchronization clock is transferred via the transmission line 122, and the latch signal for serial-parallel conversion is transferred via the transmission line 123. The data transfer unit 113 may transfer the heat pulse signal indicating the discharge timing via the transmission line 120 or transfer the heat pulse signal via the transmission line 121 by containing a command in the serial data. The heat pulse signal converted into a command may also be referred to as heat pulse encoded data hereinafter. Note that the CPU 105 performs the above-described operation and an operation to be described later by executing a program stored in, for example, a ROM 106. Assume that the error detection code also contains an error correction code which allows not only error detection but also correction.

On the other hand, the printhead 102 receives a signal by a command analysis unit 133, generates a data reception start signal 134, and notifies an error detection unit 135 of the data reception start signal 134. That is, the command analysis unit 133 also functions as a data reception unit. Furthermore, if the reception data contains the heat pulse signal as a command, the heat pulse signal may be restored (generated) from the reception data. A heat pulse selection unit 132 selects one of the heat pulse signal transferred via the transmission line 120 and the heat pulse signal generated by the command analysis unit to use, and transmits the selected heat pulse signal to a discharge determination unit 137. Using the data reception start signal 134 as a trigger, the error detection unit 135 analyzes the serial data received via the transmission line 123, determines whether a bit error has occurred in the transmission line 121, and notifies the discharge determination unit 137 of a determination result signal 140. The discharge determination unit 137 masks the heat pulse signal based on the determination result signal 140, and transmits a masked heat pulse signal 141 to a discharge nozzle group 139. A serial-parallel conversion unit 136 converts the received serial signal into parallel data corresponding to a discharge nozzle, generates a parallel signal for selecting the discharge nozzle, and transmits the generated parallel signal to the discharge nozzle group 139. If each discharge nozzle 138 is selected, based on the parallel signal, to discharge ink, it discharges ink in synchronism with the masked heat pulse signal 141, and prints on the printing medium. The discharge determination unit 137, serial-parallel conversion unit 136, discharge nozzle group 139, and the like function as units for executing processing based on the received data, for example, processing of printing on the medium by discharging ink.

<Data Transfer Unit>

Figure 2:
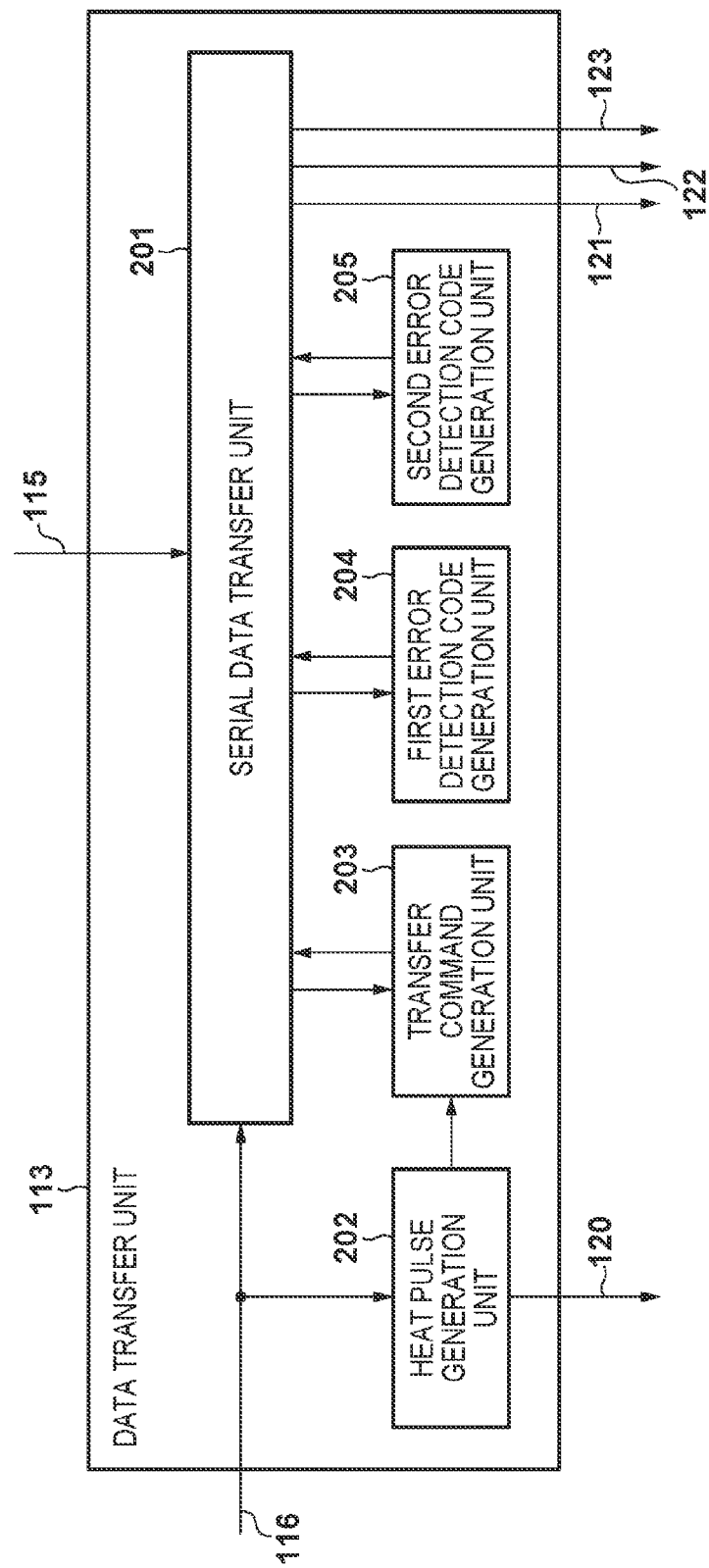
FIG. 2 is a block diagram for explaining a data transfer unit in a control device.

FIG. 2 is a block diagram for explaining the data transfer unit 113 in the control device. The data transfer unit 113 includes a heat pulse generation unit 202 for generating a heat pulse signal indicating an ink discharge timing based on print data 115 and the printing timing signal 116 from the driving control unit 111. The data transfer unit 113 includes a transfer command generation unit 203 for generating a command for communication with the printhead. Furthermore, the data transfer unit 113 includes a first error detection code generation unit 204 for extracting odd-numbered bits corresponding to odd-numbered digits of transfer data, and generating the first error detection code. The data transfer unit 113 also includes a serial data transfer unit 201 and a second error detection code generation unit 205 for extracting even-numbered bits corresponding to even-numbered digits of the transfer data, and generating the second error detection code. Note that the odd-numbered bits and even-numbered bits indicate bits which alternately appear, and may be interchanged. The transfer command generation unit 203 may encode the heat pulse signal, and transmit it as a command to the serial data transfer unit 201. Based on the printing timing signal 116, the serial data transfer unit 201 generates the latch signal for serial-parallel conversion and the transfer synchronization clock transmitted via the transmission line 122. The serial data transfer unit 201 adds the command and error detection codes to the print data, thereby generating serial data synchronized with the transfer synchronization clock transferred via the transmission line 122. Note that this serial data is transmitted via the transmission line 121.

<Example of Error Detection Code Generation>

Figure 3:
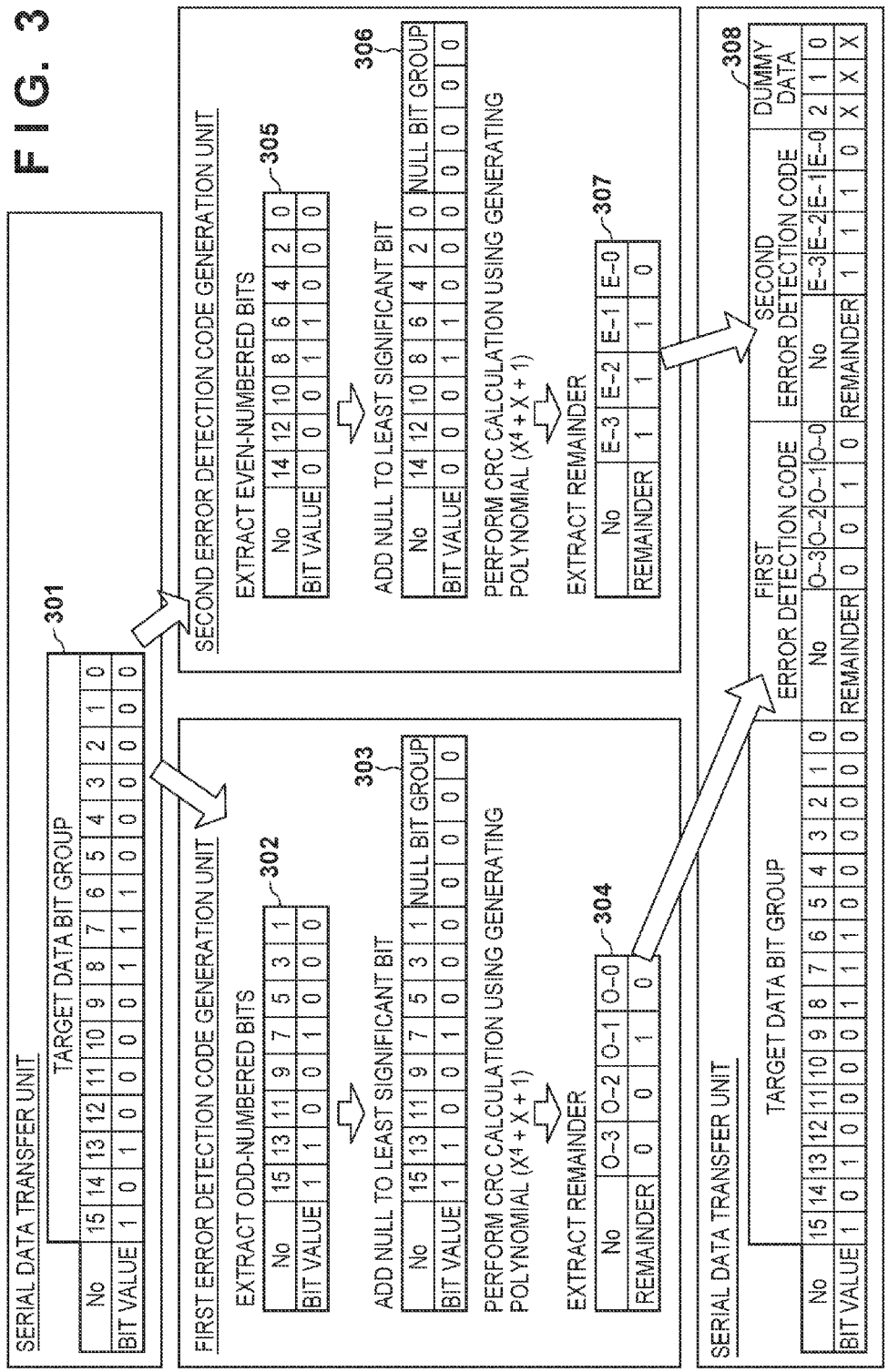
FIG. 3 is a view for explaining error detection code generation by the data transfer unit according to the first embodiment.

FIG. 3 is a view for explaining an example of error detection code generation by the data transfer unit 113. The serial data transfer unit 201 stores a target data bit group 301 as an error detection code generation target. The target data bit group 301 includes the above-described heat pulse encoded data and print data. The first error detection code generation unit 204 extracts odd-numbered bits 302 from the target data bit group 301, and then adds null bits 303 (in this example, four digits) to the least significant digit, thereby calculating an error detection code 304. In FIG. 3, as an example, CRC-4 calculation using a generating polynomial $(X^4+X+1)$ is performed, and the remainder is returned to the serial data transfer unit 201 as the first error detection code 304 (that is, the first CRC code). The second error detection code generation unit 205 extracts even-numbered bits 305 from the target data bit group 301, and then adds null bits 306 to the least significant digit, thereby calculating an error detection code 307 (that is, the second CRC code). In FIG. 3, as an example, the CRC-4 calculation using the generating polynomial $(X^4+X+1)$ is performed, and the remainder is returned to the serial data transfer unit 201 as the second error detection code 307.

The serial data transfer unit 201 adds the above-described return values, that is, the first error detection code 304 and the second error detection code 307 to the target data bit group 301. Furthermore, the serial data transfer unit 201 generates transfer data added with dummy data 308 necessary for synchronization in the printhead 102. The dummy data 308 requires 1 bit for initialization of a calculation circuit in the printhead, 1 bit for synchronization with the leading edge of the clock, and 1 bit for synchronization with the trailing edge of the clock, that is, 3 bits in total. This corresponds to a delay by a delay circuit unit 708 to be described with reference to FIG. 7. Since the dummy data 308 is discarded in the printhead, the value may be "0" or "1", and thus "X" is described in this embodiment.

<Transfer Data and Transfer Clock>

Figure 4:
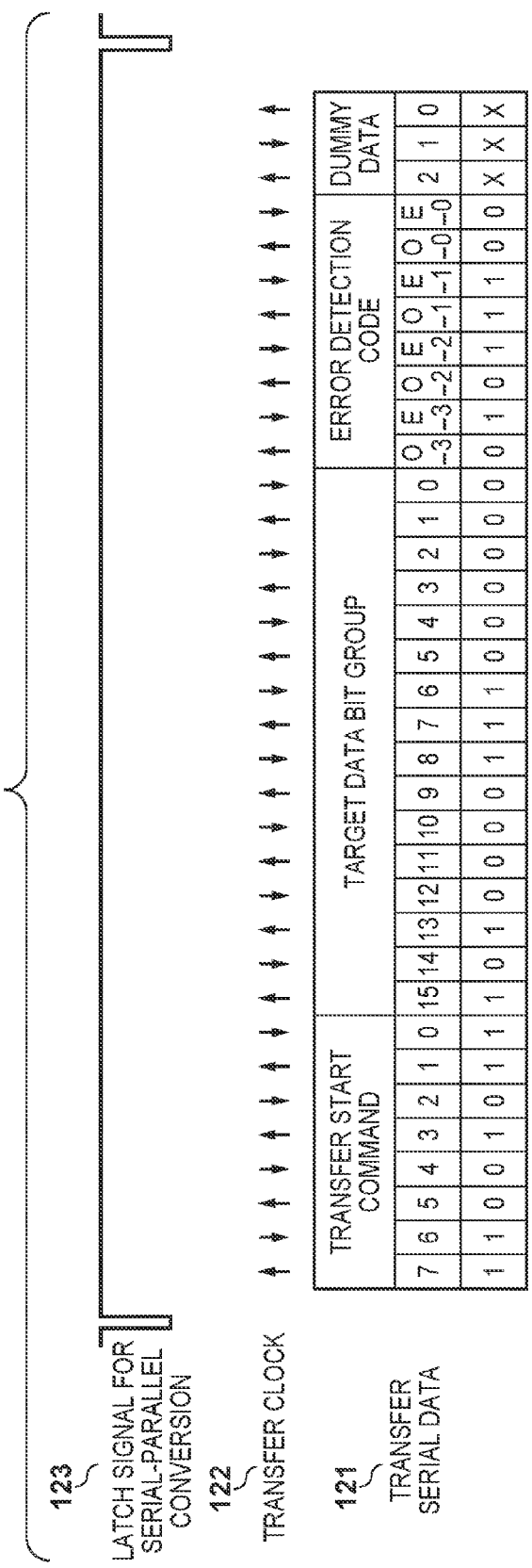
FIG. 4 is a timing chart showing the relationship between a clock and transfer data in a transmission line according to the first embodiment.

FIG. 4 is a timing chart showing the relationship between the clock and the transfer data in the transmission line. In this embodiment, the serial data includes the transfer start command indicating the transfer start, the target data bit group 301, the error detection code, and the dummy data in the order named. The serial data transfer unit 201 performs, for the transfer start command (8 bits, for example, "11001011") and the odd-numbered bits of the target data bit group (16 bits, for example, "1010000111000000"), serial transfer in synchronism with one edge (for example, the leading edge) of the transfer clock transmitted via the transmission line 122. The serial data transfer unit 201 performs, for the even-numbered bits, serial transfer in synchronism with the other edge (for example, the trailing edge) of the transfer clock transmitted via the transmission line 122. After that, in synchronism with the leading edge of the transfer clock transmitted via the transmission line 122, the serial data transfer unit 201 transfers the first error detection code 304 (4 bits, for example, "0010") generated by the first error detection code generation unit 204. Then, in synchronism with the trailing edge of the transfer clock transmitted via the transmission line 122, the serial data transfer unit 201 transfers the error detection code 307 (4 bits, for example, "1110") generated by the second error detection code generation unit 205. Since the leading edge and the trailing edge alternately appear, the error detection codes include 8 bits in total and, for example, "01011100" obtained by alternately merging the bits of the first and second error detection codes is transmitted. Finally, the arbitrary dummy data 308 (3 bits) is transferred. Note that the first error detection code 304 and the second error detection code 307 are stored for each code in FIG. 3 but may be merged in the transmission order and then stored.

<Command Analysis Unit>

Figure 5:
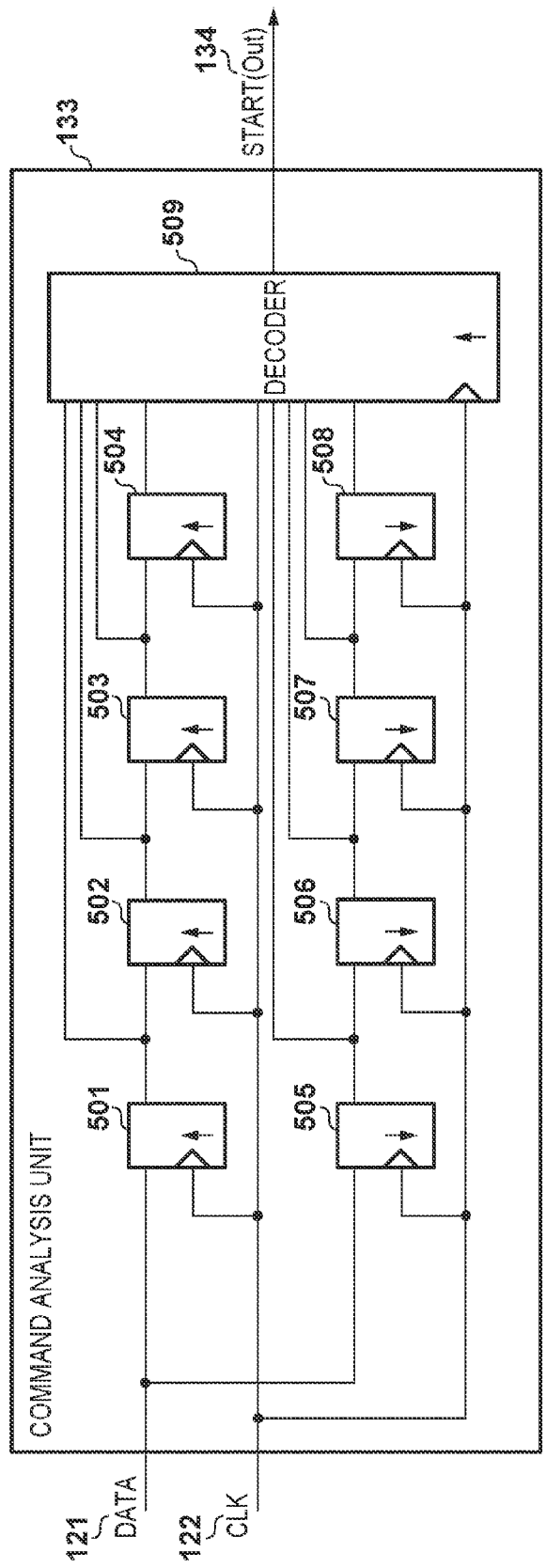
FIG. 5 is a block diagram showing an example of a command analysis unit according to the first embodiment.

FIG. 5 is a block diagram for explaining an example of the command analysis unit 133 in the printhead 102. The command analysis unit 133 receives the transfer clock and the serial data from the data transfer unit 113, analyzes the command, and generates the START signal 134 indicating the error detection start to the error detection unit in the printhead 102. As examples of the components of the command analysis unit 133, a shift register formed by latches (or flip-flops) 501 to 504, a shift register formed by latches 505 to 508, and a decoder 509 are shown. The two shift registers formed by the latches 501 to 508 will be referred to as shift registers 501 to 504 and shift registers 505 to 508, respectively, hereinafter. Note that in FIG. 5, since the data transmitted via the transmission line 121 is input from the upper digit, and the bits of the data are alternately latched, the most significant digit is on the right side in FIG. 5, and the right and left sides of the data are reversed. The data held in each latch is input to the decoder 509. With this arrangement, the data transmitted via the transmission line 121 is stored while being shifted by the shift registers 501 to 504 in synchronism with the leading edge of the clock transmitted via the transmission line 122. The data transmitted via the transmission line 121 is stored while being shifted by the shift registers 505 to 508 in synchronism with the trailing edge of the clock transmitted via the transmission line 122. After that, the values in the respective latches are input in parallel to the decoder 509. The decoder 509 includes a latch (not shown) which operates in synchronism with the leading edge of the clock transmitted via the transmission line 122, and the START signal 134 as an output is output via the latch. The decoder decodes the input 8-bit data, and outputs, if the input data is a predetermined transfer start signal, the START signal 134 via the above-described latch. Note that the arrangement of the command analysis unit 133 is not limited to this, and another arrangement may be adopted as long as the START signal 134 can be generated. Although not shown, if the command contains the heat pulse encoded data, the command analysis unit 133 may decode the data, and transfer the heat pulse signal to the heat pulse selection unit 132.

Figure 6:
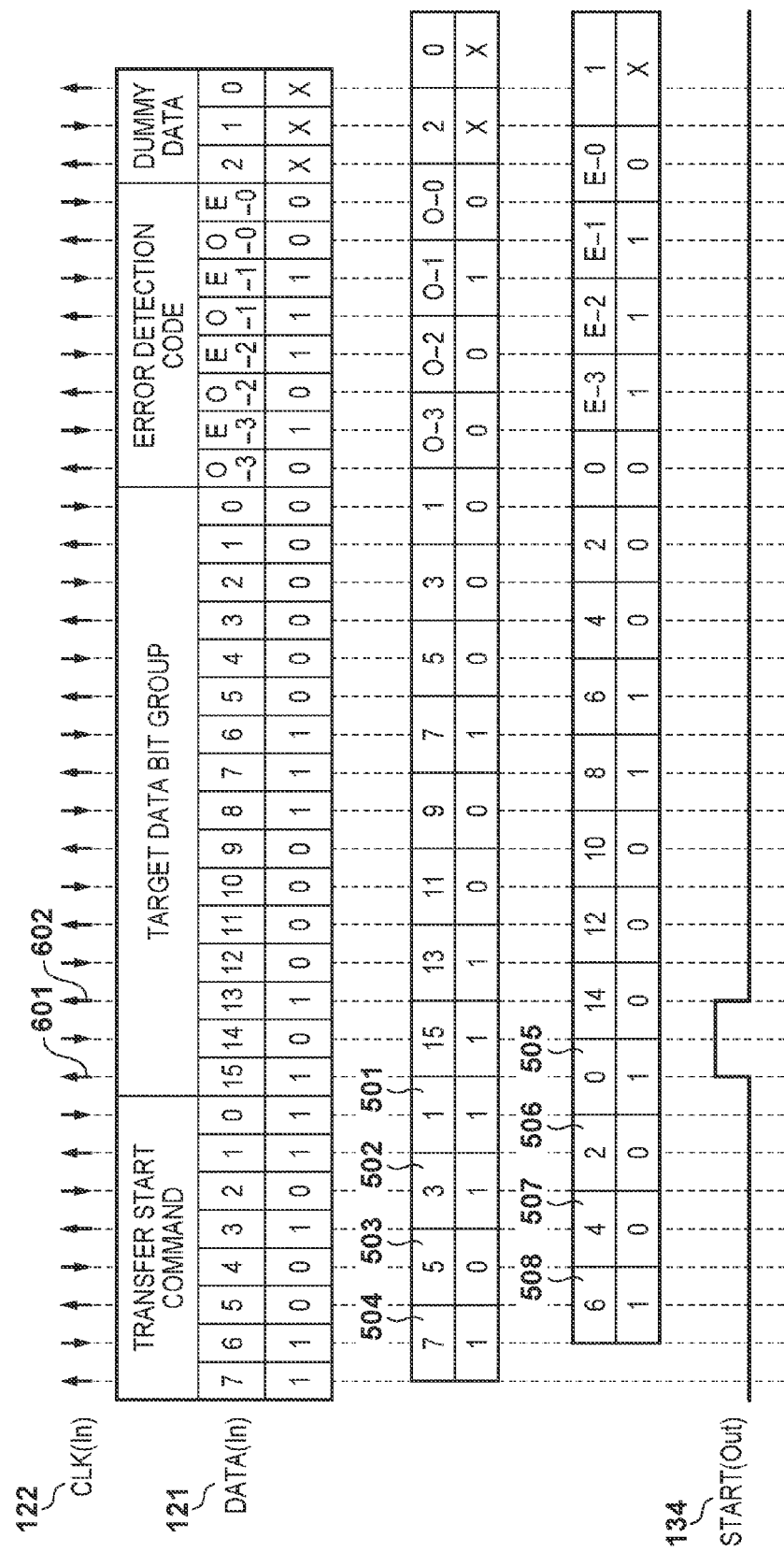
FIG. 6 is a timing chart showing the relationship between the clock and an output signal of the command analysis unit according to the first embodiment.

FIG. 6 is a timing chart showing the relationship between the output signal (START signal 134) of the command analysis unit 133 and the clock transmitted via the transmission line 122. When a specific signal is stored in the shift registers 501 to 508, the START signal is output as a pulse signal with one clock pulse width during a period from a timing 601 to a timing 602. In this embodiment, the 8-bit data "11010011" is stored in the shift registers 501 to 508 (more specifically, "1101" is stored in the shift registers 501 to 504 and "1001" is stored in the shift registers 505 to 508). At the next leading edge of the clock, the START signal of one clock pulse width is output. However, the present invention is not limited to this value as long as consistency with the data transfer unit is obtained.

<Error Detection Unit>

Figure 7:
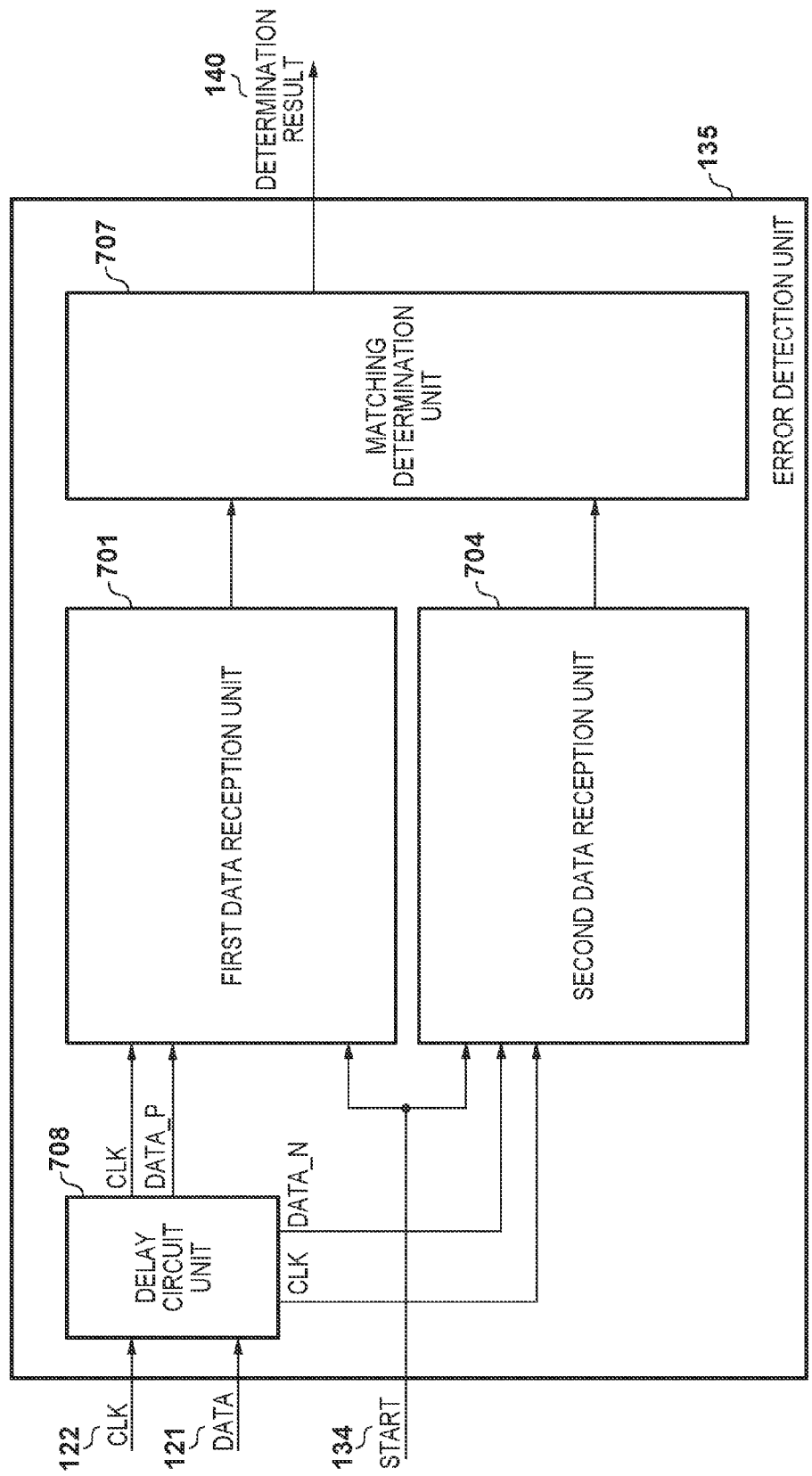
FIG. 7 is a block diagram for explaining an error detection unit according to the first embodiment.

FIG. 7 is a block diagram showing the arrangement of the error detection unit 135. The error detection unit 135 includes the delay circuit unit 708 for synchronizing the input data transmitted via the transmission line 121 with the input clock transmitted via the transmission line 122. The error detection unit 135 includes a first data reception unit 701 for receiving data (DATA_P) synchronized with the leading edge of the clock transmitted via the transmission line 122. The error detection unit 135 includes a second data reception unit 704 for receiving data (DATA_N) synchronized with the leading edge of the clock transmitted via the transmission line 122, and a matching determination unit 707 for generating an error detection result. The first data reception unit 701 and the second data reception unit 704 are circuits for performing error detection, and can thus be referred to as the first error detection unit and the second error detection unit, respectively.

Figure 8:
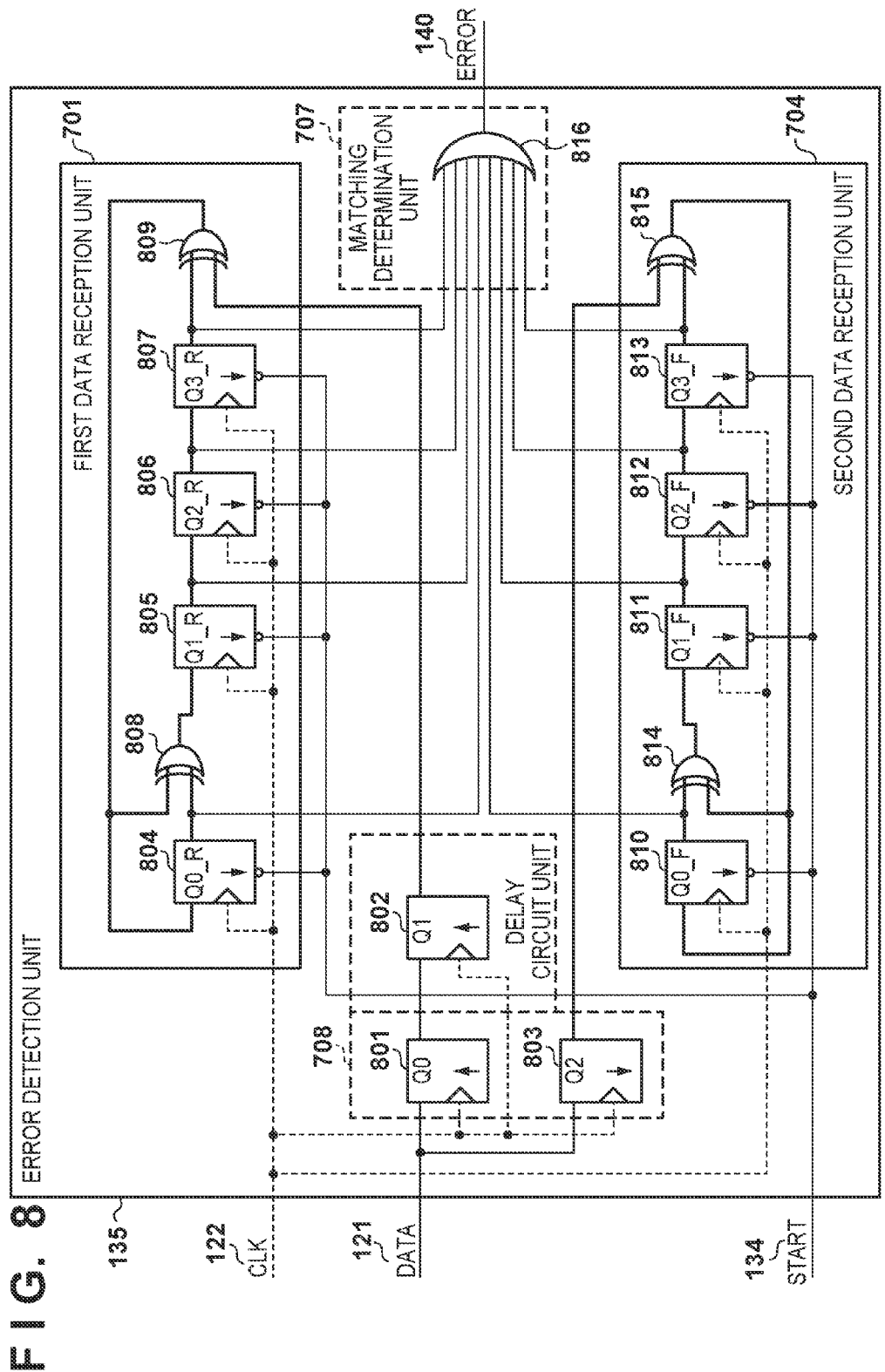
FIG. 8 is a block diagram showing the detailed arrangement of the error detection unit according to the first embodiment.

FIG. 8 is a block diagram for explaining the detailed circuit arrangement of the error detection unit 135. The delay circuit unit 708 is formed by a register 801 for receiving the input data via the transmission line 121 at the leading edge of the clock transmitted via the transmission line 122, a register 802 for receiving an output signal Q0 of the register 801, and a register 803 for receiving the input data via the transmission line 121 at the trailing edge of the clock transmitted via the transmission line 122. The delay circuit unit 708 delays the data while the respective data reception units 701 and 704 are reset by the START signal obtained by decoding the transfer start command. The first data reception unit 701 forms a CRC-4 calculation circuit by a linear feedback shift register including latches 804, 805, 806, and 807 synchronized with the trailing edge of the clock and EXOR circuits 808 and 809. A signal Q1 (DATA_P) which has been synchronized with the leading edge of the clock in the delay circuit unit 708 is input to the first data reception unit 701. The second data reception unit 704 forms a CRC-4 calculation circuit by a linear feedback shift register including latches 810, 811, 812, and 813 synchronized with the trailing edge of the clock and EXOR circuits 814 and 815. A signal Q2 (DATA_N) which has been synchronized with the trailing edge of the clock in the delay circuit unit 708 is input to the second data reception unit 704. Values stored in the shift registers of the first and second data reception units 701 and 704 are reset to 0 by the pulse signal of the START signal 134. The matching determination unit 707 is formed by an OR circuit 816, and receives signals Q0_R, Q1_R, Q2_R, Q3_R, Q0_F, Q1_F, Q2_F, and Q3_F respectively output from the latches 804 to 807 and 810 to 813 of the shift registers. The matching determination unit 707 outputs the OR as the error detection signal 140. Note that the latch at each stage forming the shift registers will also be referred to as a shift register in the following description.

Figure 9:
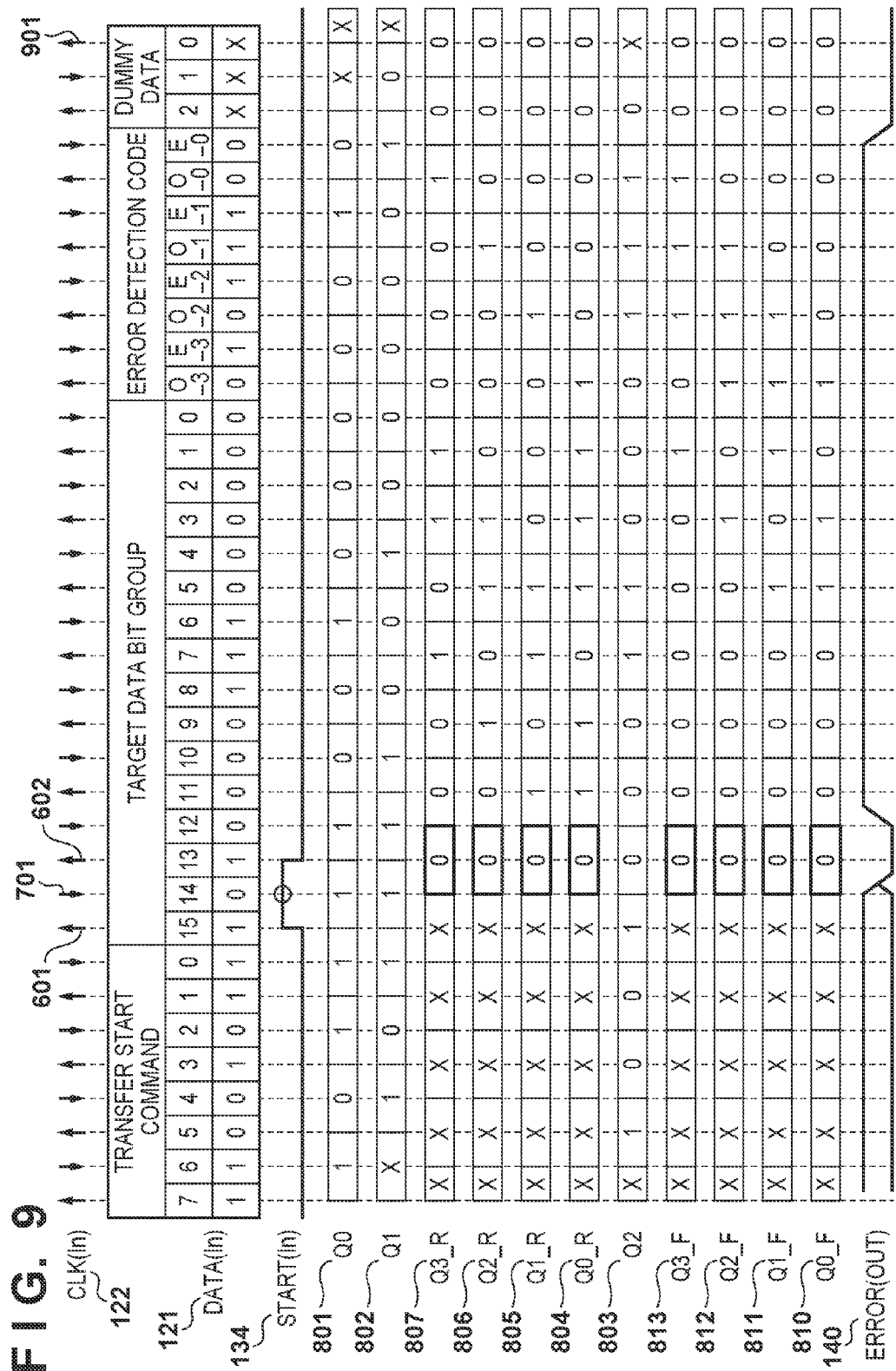
FIG. 9 is a timing chart showing the relationship between the clock and an output signal of the error detection unit at the time of normal transfer according to the first embodiment.

FIG. 9 is a timing chart showing the relationship between the clock and transition of the determination result signal (ERROR) 140 of the error detection unit 135 and the values stored in the respective registers at the time of normal transfer. Since the indefinite value "X" is stored in each of the shift registers 804, 805, 806, 807, 810, 811, 812, and 813 in the initial state, the indefinite state continues until a pulse of the START signal is input. The shift registers of each data reception unit are reset at a timing 701 of the trailing edge while the START signal is input. After that, the target data bit group, error detection code, and dummy data are sequentially input, and the error determination result 140 is confirmed at a timing 901. At the time of normal transfer, at the timing 901, since the outputs of all the shift registers 804, 805, 806, 807, 810, 811, 812, and 813 are set to "0", the determination result signal 140 of the error detection unit is set to "0". Note that at the timing 901, the 3-bit dummy data is stored in the latches of the delay circuit unit 708, and does not contribute to the determination result signal 140. If values to be latched by the shift registers at the next timing are indicated by adding "'", $Q0\_R'=Q1+Q3\_R$, $Q1\_R'=Q0\_R+Q1+Q3\_R$, $Q2\_R'=Q1\_R$, and $Q3\_R'=Q2\_R$ are obtained for the first data reception unit 701, as shown in the circuit arrangement of FIG. 8, and transit, as shown in FIG. 9. This applies to the second data reception unit 704. An arrangement of implementing CRC generation and verification by linear feedback registers is well known and a detailed description thereof will be omitted.

The inkjet printing apparatus according to this embodiment performs data transfer at a double rate which synchronizes data at the two edges of the clock signal. The inkjet printing apparatus calculates a CRC for each of a group of data (in this example, odd-numbered digits) synchronized with the leading edge of the clock and a group of data (in this example, even-numbered digits) synchronized with the trailing edge of the clock. The inkjet printing apparatus adds the corresponding CRC to each data group, and transfers it. At this time, the target data and the corresponding CRC are transferred in synchronism with the edge on the same side of the clock. For example, the odd-numbered bits of the data and the error detection code generated from the odd-numbered bits are transferred in synchronism with the edge on the same side, for example, the leading edge of the clock. The same applies to the even-numbered bits. The error detection unit 135 of the printhead 102 shown in FIG. 8 latches the data of each group in synchronism with the corresponding edge of the clock, and verifies the CRC for each group, and detects an error. Consequently, while data transfer can be performed at twice the clock rate, the circuit for performing processing such as reception of each data group and error detection can be operated at the clock rate. In addition, it is not necessary to use a buffer for storing reception data at the preceding stage of error detection and the like, and error detection can be performed with a very short delay, substantially in real time. As described above, according to this embodiment, for example, it is possible to implement the processing circuit, especially the error detection circuit of the printhead on the reception side by a simple arrangement while improving the data transfer rate from the main body of the inkjet printing apparatus to the printhead. Furthermore, it is possible to produce the effect of requiring an operation clock rate lower than the transfer rate (more specifically, a half rate).

Figure 10:
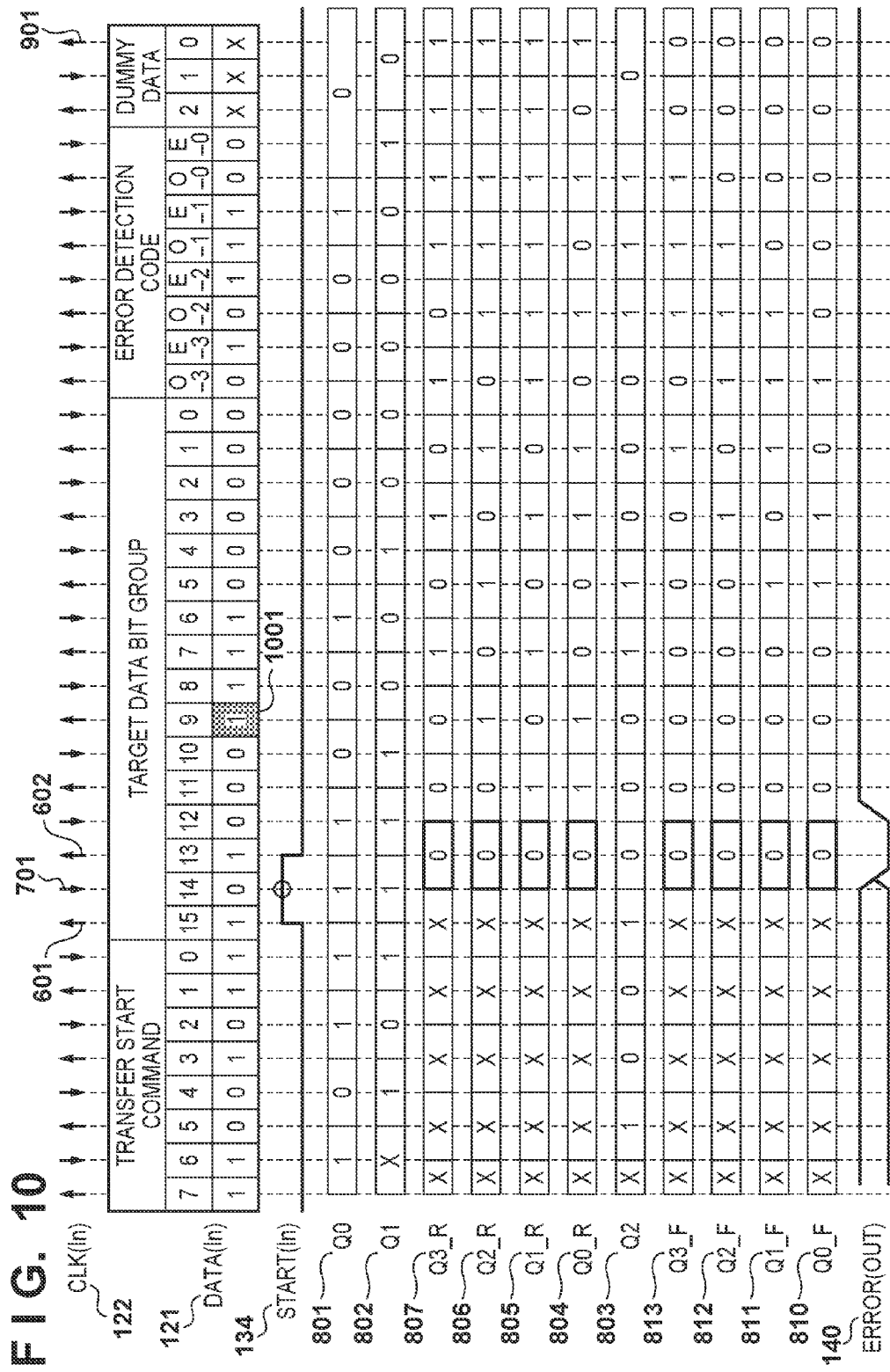
FIG. 10 is a timing chart showing the relationship between the clock and the output signal of the error detection unit at the time of abnormal transfer according to the first embodiment.

FIG. 10 is a timing chart showing the relationship between the clock and the output signal of the error detection unit at the time of abnormal transfer. Assume, for example, that a bit 1001 includes an error in the transmission line. Although the value of the bit 1001 is "0" in FIG. 9, it is set to "1" due to some influence in the transmission line. In this case, at the timing 901, the output signals of the shift registers 804, 805, 806, and 807 are set to "1", and thus the determination result signal 140 as the output signal of the error detection unit is set to "1". Although this embodiment has explained a case in which the bit 1001 includes an error, the present invention is not limited to this. If one of the outputs of the shift registers 804, 805, 806, 807, 810, 811, 812, and 813 is set to "1" at the timing 901, it is possible to detect an error which occurs at any bit of the target data bit group and error detection code.

Note that with respect to the discharge data and the data containing the heat pulse and other commands, the serial-parallel conversion unit 136 is formed to have an arrangement similar to, for example, that of the error detection unit 135 shown in FIG. 8. By forming the serial-parallel conversion unit 136 to operate at the same timing, it is possible to convert serial data into parallel data. Since, however, the serial-parallel conversion unit 136 performs no error detection, normal 8-bit shift registers are used instead of the linear feedback shift registers shown in FIG. 8. This register is reset by the START signal, and stops after an operation for eight clocks until the next START signal. During this period, the data is fetched from the shift register, and written in a predetermined memory, and control corresponding to the data is executed. The arrangement of the serial-parallel conversion unit 136 is not limited to this, as a matter of course. Any arrangement capable of converting serial data into parallel data can be adopted.

As described above, according to this embodiment, in the error detection unit 135 in the printhead 102, the first data reception unit 701 synchronized with the leading edge of the clock and the second data reception unit 704 synchronized with the trailing edge of the clock are formed. With this arrangement, it is possible to execute an error detection method capable of performing double error detection processing without doubling the transfer frequency. For example, if the transfer rate between the control device 101 and the printhead 102 is 100 Mbps, the error detection unit of the printhead having an arrangement of receiving data for each bit needs to be driven at 100 MHz. On the other hand, the first data reception unit 701 synchronized with the leading edge of the clock and the second data reception unit 704 synchronized with the trailing edge of the clock operate at 50 MHz. That is, it is possible to perform data transfer at 100 Mbps while the transfer frequency remains 50 MHz, and perform error detection by a circuit which operates at 50 MHz.

This embodiment describes a case in which the discharge determination unit 137 is notified of the error detection result to mask the heat pulse signal. This effect will be explained. Assume, for example, that a heat pulse generation command is transferred by 8 bits of the 15th to eighth bits of the target data bit group 301, and discharge data indicating discharge/non-discharge of the eight discharge nozzles 138 included in the discharge nozzle group 139 is transferred by 8 bits of the seventh to 0th bits. In this case, if a bit error occurs in the transmission line, the duty of the heat pulse generated by the command analysis unit 133 may have a width larger than necessary, thereby damaging the discharge nozzle 138. To solve this problem, the discharge determination unit 137 is notified of the error detection result, and a heat pulse is prevented from being generated when an error has occurred, thereby making it possible to prevent damage to the discharge nozzle 138. For example, the discharge data or heat pulse corresponding to the error is masked not to operate the corresponding nozzle. In this case, therefore, ink to be originally discharged cannot be discharged for, at most, eight dots, that is, eight pixels cannot be printed.

As described above, according to this embodiment, while the data transfer rate is increased to twice the clock rate, it is possible to execute data processing on the reception side in synchronism with the clock rate. Therefore, by increasing the transfer rate, it is possible to compensate for a decrease in effective transfer rate caused when the data transfer efficiency decreases due to addition of an error detection code to the data. Furthermore, since this is implemented by an arrangement using an external clock which is not embedded in the data, the scale of a circuit on the reception side, for example, the scale of the error detection circuit provided in the inkjet head can be suppressed to be small. In addition, the operation clock of the circuit on the reception side, for example, the operation clock of the error detection circuit provided in the inkjet head may be the same as the data transfer clock, and the circuit can be operated at a rate significantly lower than the transfer rate.

Second Embodiment

The first embodiment has explained an embodiment in which the CRC-4 calculation is adapted as an error detection method. The present invention, however, is not limited to this. For example, parity calculation may be used. An embodiment in which the parity calculation is adapted as an error detection method will be described below with reference to FIGS. 11, 12, 13, and 14.

Figure 11:
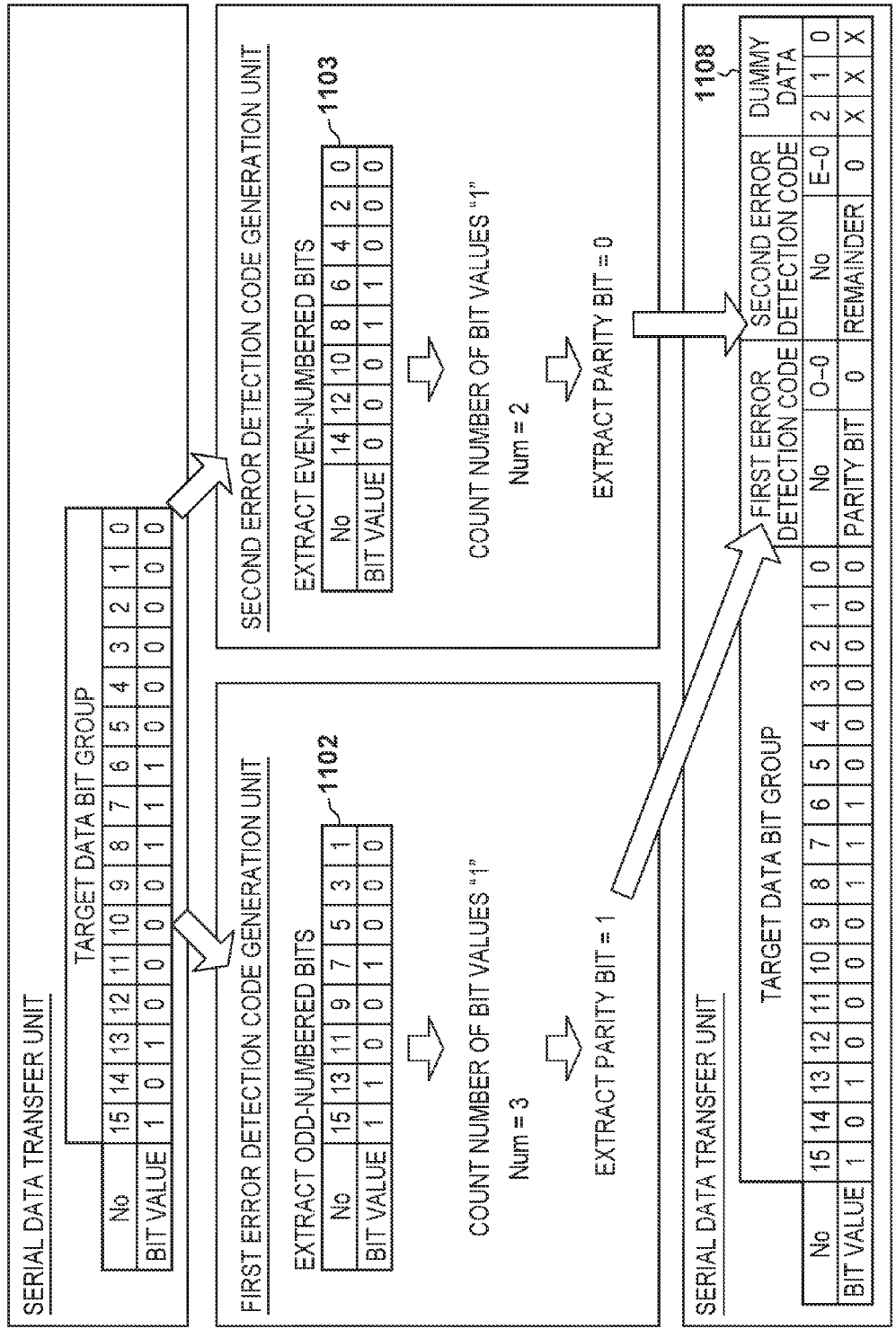
FIG. 11 is a view for explaining error detection code generation by a data transfer unit according to the second embodiment.

FIG. 11 is a view for explaining error detection code generation by a data transfer unit according to the embodiment in which the parity calculation is adapted. A first error detection code generation unit 204 in a serial data transfer unit 201 extracts odd-numbered bits 1102 from an error detection code generation target data bit group, and counts the number of bits each having a bit value "1". The first error detection code generation unit 204 extracts, as a parity bit, a remainder obtained by dividing the count value by 2, and returns the value to the serial data transfer unit 201. A second error detection code generation unit 205 extracts even-numbered bits 1103 from the error detection code generation target data bit group, counts the number of bits each having a bit value "1", extracts, as a parity bit, a remainder obtained by the dividing the count value by 2, and returns the value to the serial data transfer unit 201. The serial data transfer unit stores the above-described return values, and generates dummy data 1108 necessary for synchronization in a printhead 102.

Figure 12:
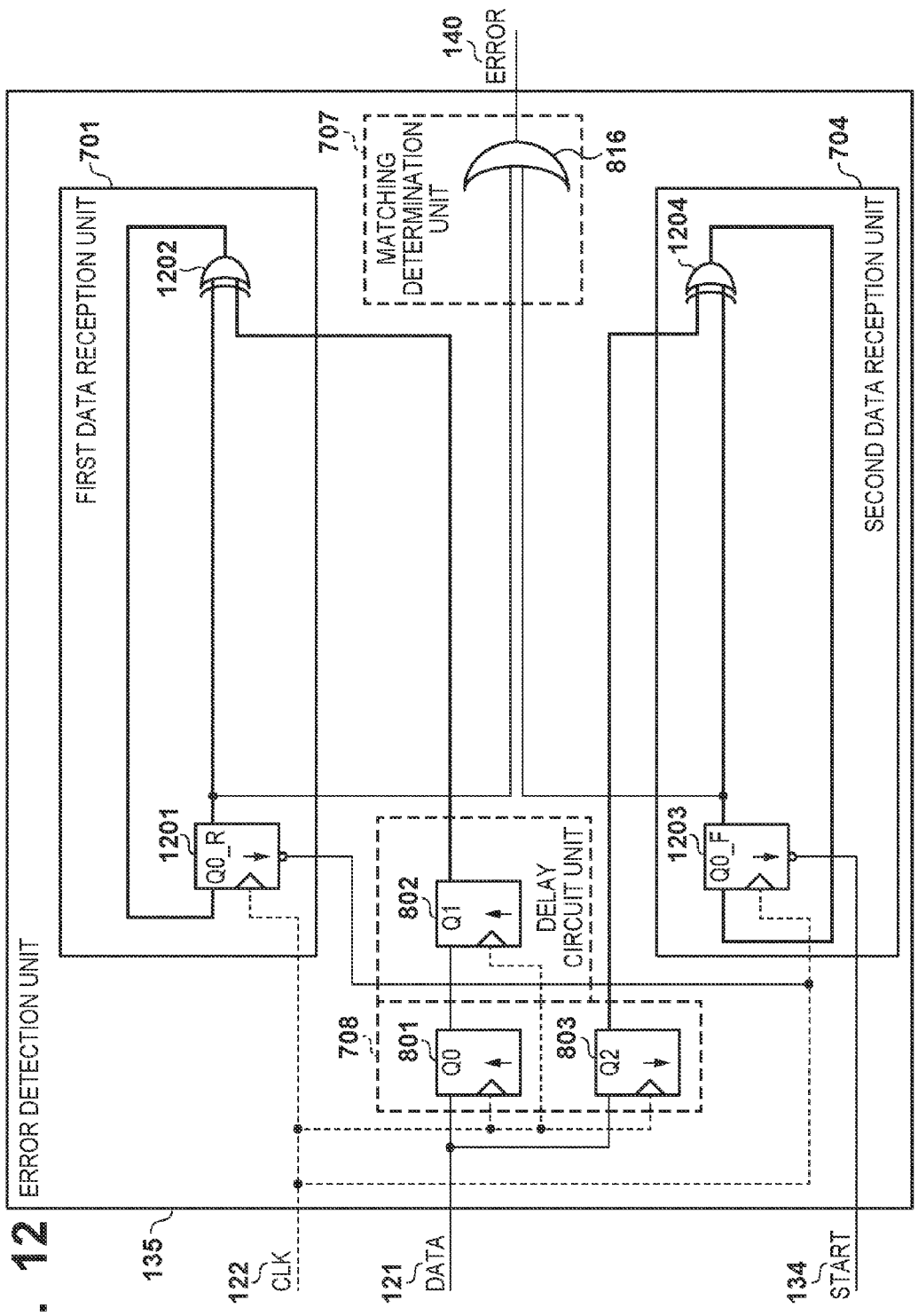
FIG. 12 is a block diagram showing the detailed arrangement of an error detection unit according to the second embodiment.

FIG. 12 is a block diagram showing the detailed arrangement of an error detection unit according to the embodiment in which the parity calculation is adapted. A delay circuit unit 708 is formed by a register 801 for receiving, at the leading edge of a clock transmitted via a transmission line 122, input data transmitted via a transmission line 121, a register 802 for receiving an output signal Q0 of the register 801, and a register 803 for receiving, at the trailing edge of the clock transmitted via the transmission line 122, the input data transmitted via the transmission line 121. A first data reception unit 701 forms a parity bit calculation circuit by a register 1201 synchronized with the trailing edge of the clock and an EXOR circuit 1202. The first data reception unit 701 receives a signal Q1 which has been synchronized with the leading edge of the clock in the delay circuit unit 708. A second data reception unit 704 forms a parity bit calculation circuit by a register 1203 synchronized with the trailing edge of the clock and an EXOR circuit 1204. The second data reception unit 704 receives a signal Q2 which has been synchronized with the trailing edge of the clock in the delay circuit unit 708. Values stored in the registers forming the first and second reception units 701 and 704 are reset to 0 by a pulse signal of a START signal 134. A matching determination unit 707 is formed by an OR circuit, and receives signals Q0_R and Q0_F output from the registers 1201 and 1203 and outputs an error detection signal 140.

Figure 13:
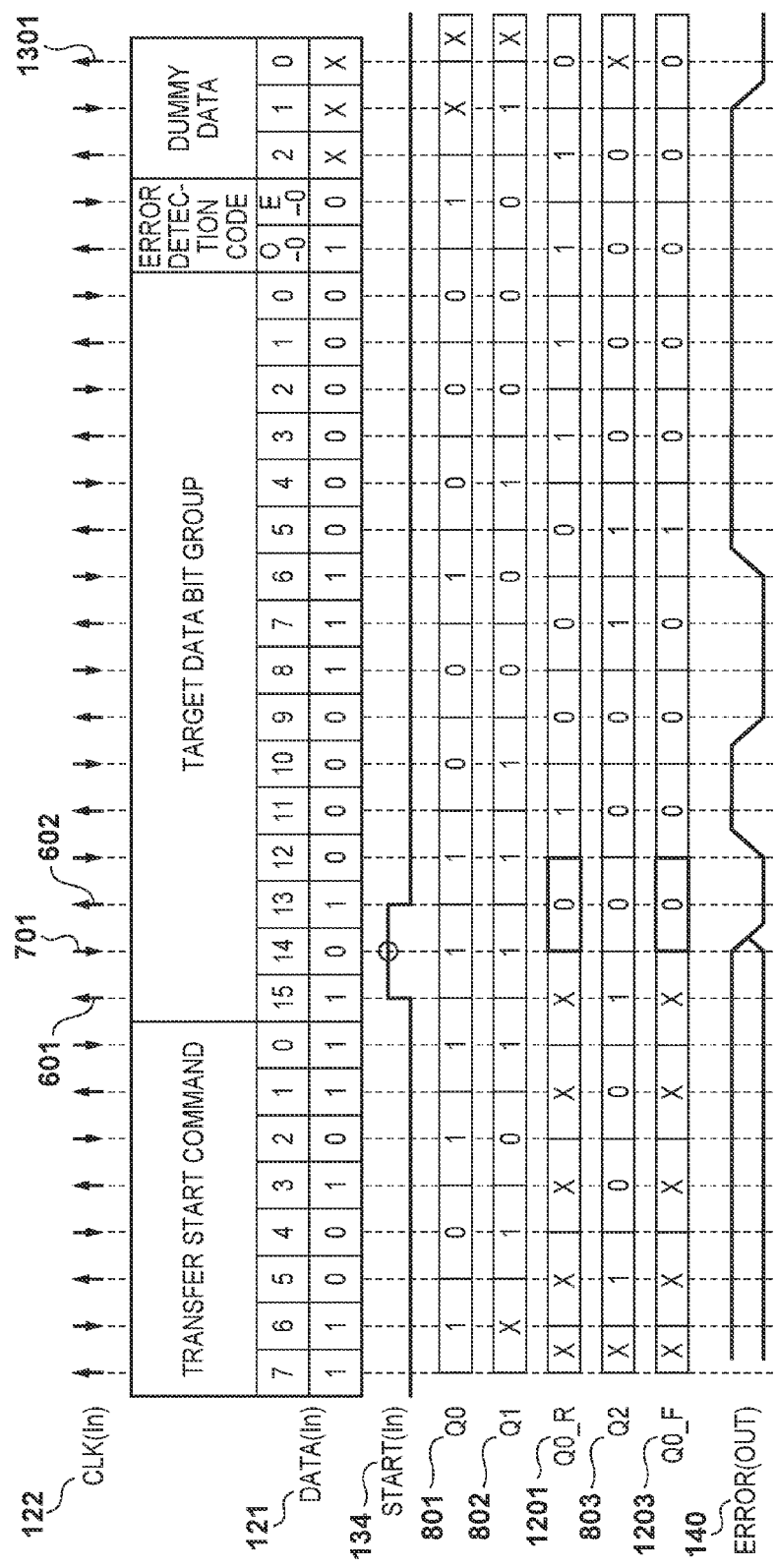
FIG. 13 is a timing chart showing the relationship between a clock and an output signal of the error detection unit at the time of normal transfer according to the second embodiment.

FIG. 13 is a timing chart showing the relationship between the clock and transition of the output signal 140 of the error detection unit and the values stored in the respective registers at the time of normal transfer according to the embodiment in which the parity calculation is adapted. Since an indefinite value "X" is stored in each of the registers 1201 and 1203 in the initial state, the indefinite state continues until a pulse of the START signal is input. The registers are reset at a timing 701, and sequentially store input data. At a timing 901 when the error detection code generation target data bit group, error detection code, and dummy data are input, an error determination result is confirmed. At the time of normal transfer, at a timing 1301, since both the outputs of the registers 1201 and 1203 are set to "0", the output signal 140 of the error detection unit is set to "0".

Figure 14:
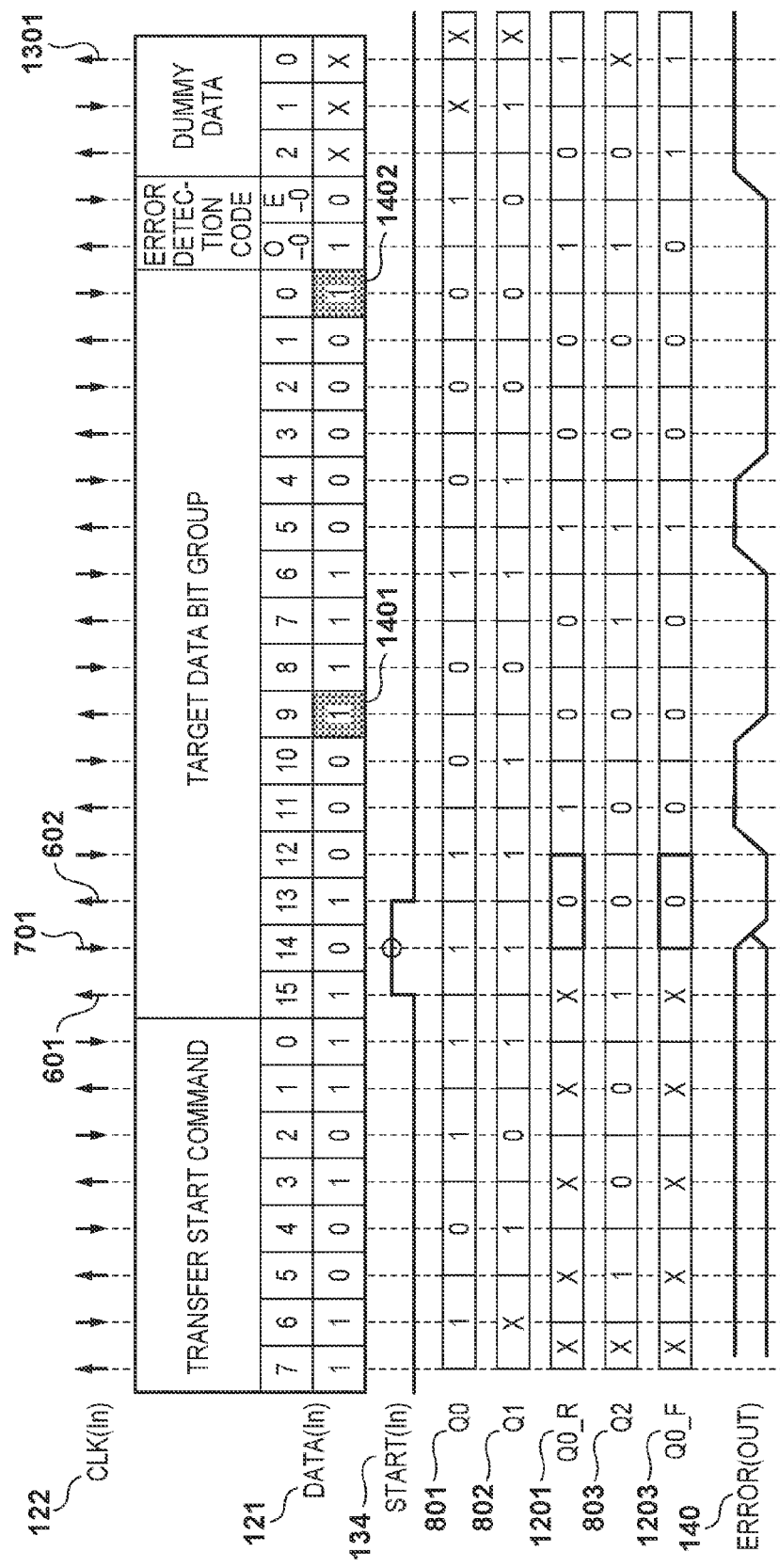
FIG. 14 is a timing chart showing the relationship between the clock and the output signal of the error detection unit at the time of abnormal transfer according to the second embodiment.

FIG. 14 is a timing chart showing the relationship between the clock and the output signal of the error detection unit at the time of abnormal transfer according to the embodiment in which the parity calculation is adapted. Assume, for example, that data bits 1401 and 1402 include errors in the transmission line. Although the values of the bits are "0"s, respectively, in FIG. 13, they are set to "1"s, respectively, due to some influence in the transmission line. In this case, since the output signals of the registers 1201 and 1203 are set to "1"s, respectively, at the timing 1301, the output signal 140 of the error detection unit is set to "1". Although this embodiment has explained a case in which the bits 1401 and 1402 include errors, the present invention is not limited to this. If one of the outputs of the registers 1201 and 1203 is set to "1" at the timing 1301, it is possible to detect an error which occurs at any bit of the error detection code generation target data bit group and error detection code.

Although the code added to the data is a CRC in the first embodiment, the parity bit is added in the second embodiment, and thus the arrangements of the data reception units 701 and 704 serve as error detection circuits of the data added with the parity bit. The parity bit is to be verified in this embodiment. However, with respect to the circuit according to this embodiment, for example, it is possible to improve the data transfer rate from the main body of an inkjet printing apparatus to the printhead, similarly to the first embodiment. With respect to the circuit according to this embodiment, the processing circuit, especially the error detection circuit of the printhead on the reception side can be implemented by a simple arrangement, and it is possible to produce the effect of requiring an operation clock rate lower than the transfer rate (more specifically, a half rate), similarly to the first embodiment.

Third Embodiment

In the first and second embodiments, error detection is performed using the START signal as a trigger. However, analysis of reception data and storage of a detection code may be operated in parallel using another signal.

Figure 15:
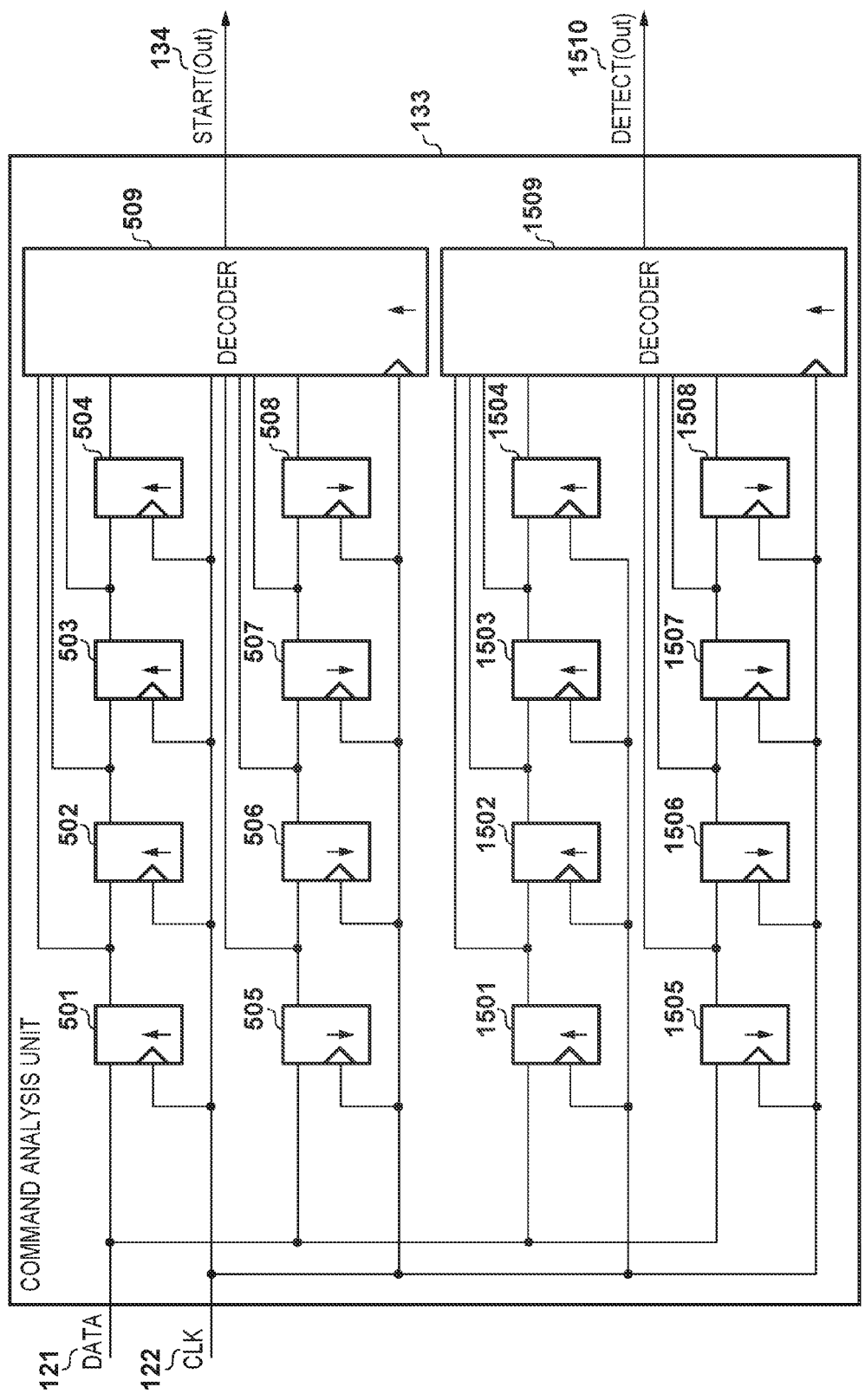
FIG. 15 is a block diagram for explaining an example of a command analysis unit according to the third embodiment.

FIG. 15 is a block diagram for explaining a command analysis unit 133 including a circuit for generating a DETECT signal indicating the start of an error detection code in addition to a circuit for generating a START signal. FIG. 15 shows shift registers including latches 1501 to 1508, and a decoder 1509, as an example. The present invention, however, is not limited to this. Another arrangement may be adopted as long as it is possible to generate a DETECT signal 1510. The DETECT signal generation circuit is the same as the START signal generation circuit in terms of the circuit arrangement but is different from the START signal generation circuit in that a code to be decoded is an error detection start code, and if the error detection start code is detected, the DETECT signal is output.

Figure 16:
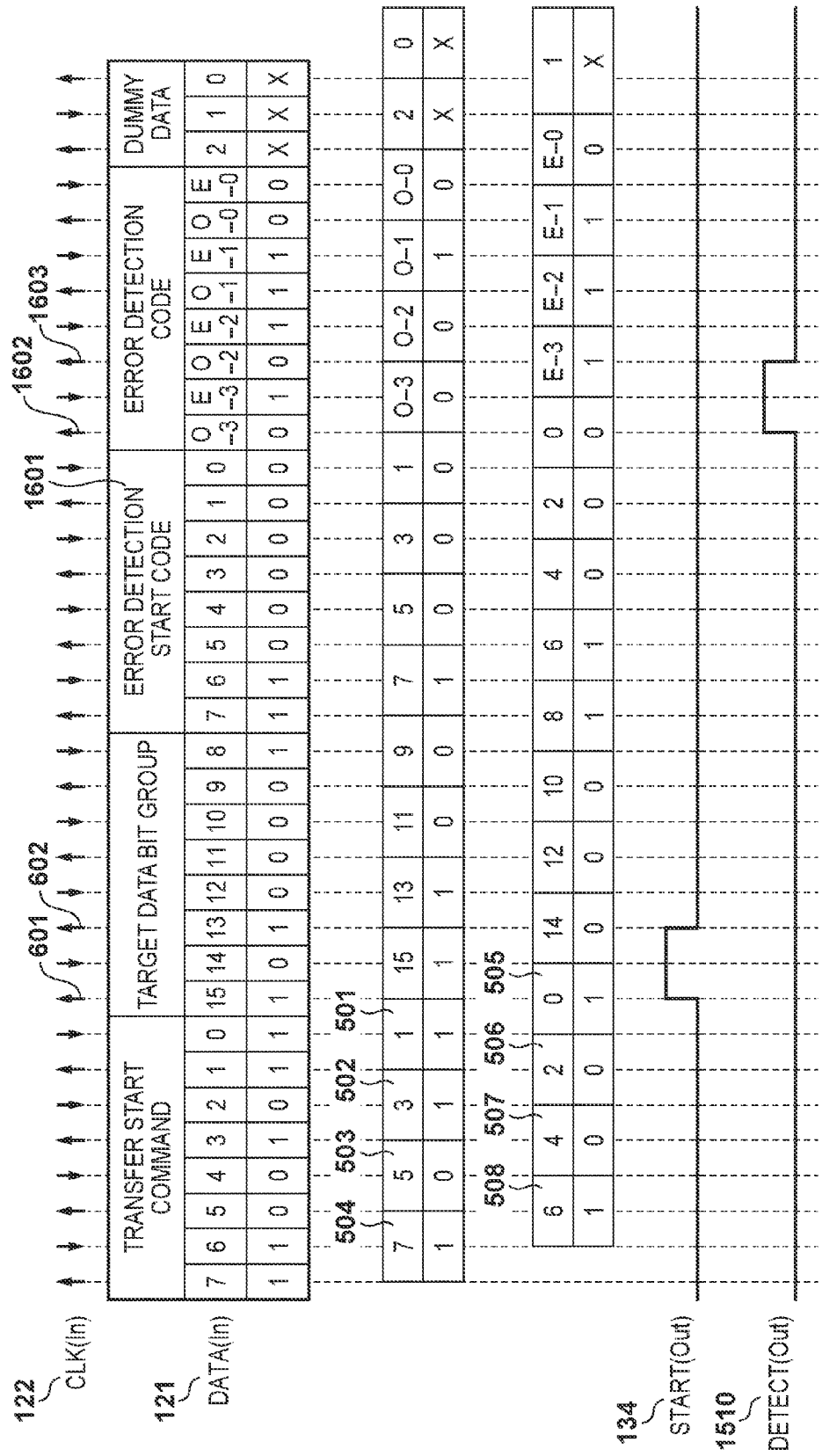
FIG. 16 is a timing chart showing the relationship between a clock and an output signal of the command analysis unit according to the third embodiment.

FIG. 16 is a timing chart showing the relationship between a clock and the DETECT signal output from the command analysis unit. When a specific signal is stored in the shift registers 1501 to 1508, the DETECT signal is output as a pulse signal during a period from a timing 1602 to a timing 1603. In this embodiment, if 8-bit data "11000000" indicating an error detection start code 1601 is stored in the shift registers 1508 to 1501, the START signal is output, but the present invention is not limited to this value as long as consistency with a data transfer unit is obtained. Although not shown, the error detection start code is generated by a serial data transfer unit in a data transfer unit 113.

FIG. 17 is a block diagram for explaining details of an error detection unit when the DETECT signal is used. A first data reception unit 701 includes a first reception data analysis unit 1702 and a first error detection code reception unit 1703. Using a pulse of the START signal as a trigger, the first reception data analysis unit 1702 receives a target data bit group as a target of the error detection code synchronized with the leading edge of the clock, and generates an error detection code from data obtained before a pulse of the error detection start code is received. Using the DETECT signal as a trigger, the first error detection code reception unit 1703 receives the error detection code synchronized with the leading edge of the clock. A second data reception unit 704 includes a second reception data analysis unit 1704 and a second error detection code reception unit 1705. Using a pulse of the START signal as a trigger, the second reception data analysis unit 1704 receives a target data bit group as a target of the error detection code synchronized with the leading edge of the clock, and generates an error detection code from data obtained before a pulse of the error detection start code is received. Using the DETECT signal as a trigger, the second error detection code reception unit 1705 receives the error detection code synchronized with the leading edge of the clock.

As an example of the circuit shown in FIG. 17, the first reception data analysis unit 1702 has, for example, the same arrangement as that of the first data reception unit 701 shown in FIG. 8, and further includes a register for holding the values of latches 804 to 807 using the pulse of the error detection start signal as a trigger. After the target data is received, this register holds the error detection code generated from the target data. The output of the register is input to a matching determination unit 707. The second reception data analysis unit 1704 has, for example, the same arrangement as that of the second data reception unit 704 shown in FIG. 8, and further includes a register for holding the values of latches 810 to 813 using the pulse of the error detection start signal as a trigger. The output of the register is input to the matching determination unit 707. The first error detection code reception unit 1703 includes, for example, a 4-bit shift register which is reset by the DETECT signal and is synchronized with the leading edge of the clock, and the values of the shift register are input in parallel to the matching determination unit 707. The shift register holds the error detection code received for four clocks from the DETECT signal. The second error detection code reception unit 1705 also has the same arrangement. This arrangement is merely an example, as a matter of course.

The matching determination unit 707 compares the error detection code generated by the first reception data analysis unit 1702 with that received by the first error detection code reception unit 1703. The matching determination unit 707 also compares the error detection code generated by the second reception data analysis unit 1704 with that received by the second error detection code reception unit 1705. If a detection code generation algorithm in the first and second reception data analysis units 1702 and 1704 is the same as that in first and second error detection code generation units 204 and 205, error detection can be performed using the comparison results of the matching determination unit. That is, the error detection code generated by the first reception data analysis unit 1702 is compared with that received by the first error detection code reception unit 1703. If the codes mismatch, or the error detection code generated by the second reception data analysis unit 1704 is compared with that received by the second error detection code reception unit 1705 and it is determined that a mismatch occurs, this indicates that a bit error has occurred in a transmission line. Therefore, for example, the matching determination unit 707 exclusive-ORs corresponding digits of the error detection code generated by the first reception data analysis unit 1702 and that received by the first error detection code reception unit 1703. Furthermore, the matching determination unit 707 exclusive-ORs corresponding digits of the error detection code generated by the second reception data analysis unit 1704 and that received by the second error detection code reception unit 1705. The matching determination unit 707 outputs the OR "0" of the two values as a determination result signal. This arrangement is merely an example, as a matter of course.

According to the above-described embodiment, similarly to the first embodiment, for example, it is possible to improve the data transfer rate from the main body of an inkjet printing apparatus to a printhead. Furthermore, similarly to the first embodiment, it is possible to implement the processing circuit, especially the error detection circuit of the printhead on the reception side by a simple arrangement, and produce the effect of requiring an operation clock rate lower than the transfer rate (more specifically, a half rate).

Other Embodiments

The above embodiments have described an error detection code. However, for example, if another error correction code is used, the invention according to the above embodiments is applicable. Furthermore, any processing circuit capable of individually applying even-numbered bits and odd-numbered bits of received data is applicable instead of the error detection circuit according to the above embodiments.

The invention described in the above embodiments need not always include only essential items for constituting the invention. With respect to one aspect of the invention extracted from the embodiments, an attempt to associate an essential part with the embodiment is made, thereby providing the following description.

(1) A data transfer unit is a unit for generating an error detection code from each of a group of odd-numbered bits of target data and a group of even-numbered bits of the target data, adding the generated error detection codes to the target data, and transferring the obtained target data to a printhead in synchronism with two edges of a clock as a synchronization signal. It is desirable that the data transfer unit is included in the control unit of the main body of a printing apparatus. In this case, that is, in the above embodiment, the clock as the synchronization signal is desirably a rectangular wave whose duty is 0.5.

(2) An error detection unit is a unit for detecting an error for each of the group of odd-numbered bits of the target data and the group of even-numbered bits of the target data, which have respectively been received in synchronism with the two edges of the synchronization signal.

(3) A discharge determination unit 137 is a unit for controlling ink discharge with respect to data in which an error has been detected.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-101332, filed May 18, 2015 which is hereby incorporated by reference herein in its entirety.

What is claimed is:

1. A data communication system for transmitting data from a data transmission unit to a data reception unit,
   the data transmission unit comprising
   a first error detection code generation unit configured to generate a first error detection code based on odd-numbered bits corresponding to odd-numbered digits of transfer data,
   a second error detection code generation unit configured to generate a second error detection code based on even-numbered bits corresponding to even-numbered digits of the transfer data, and
   a transmission unit configured to transmit the first error detection code, the second error detection code, and the transfer data to the data reception unit,
   wherein the first error detection code generation unit, the second error detection code generation unit and the transmission unit are performed by a processor, and
   the data reception unit comprising
   a reception circuit configured to receive the transfer data, the first error detection code, and the second error detection code, and
   an error detection circuit configured to detect an error based on each of a group of the odd-numbered bits of the transfer data and the first error detection code and a group of the even-numbered bits of the transfer data and the second error detection code.

2. The system according to claim 1, wherein
   the transmission unit is configured to transmit the odd-numbered bits of the transfer data and the first error detection code in synchronism with one edge of a pulse of a synchronization signal, and transmit the even-numbered bits of the transfer data and the second error detection code in synchronism with the other edge of the pulse of the synchronization signal, and
   the reception circuit is configured to receive the odd-numbered bits of the transfer data and the first error detection code in synchronism with the one edge of the pulse of the synchronization signal, and receive the even-numbered bits of the transfer data and the second error detection code in synchronism with the other edge of the pulse of the synchronization signal.

3. The system according to claim 1, wherein each of the first error detection code generation unit and the second error detection code generation unit is configured to generate a CRC code, and the error detection circuit is configured to detect an error based on the CRC codes.

4. The system according to claim 3, wherein the error detection circuit is configured to generate a CRC code from each of a group of the odd-numbered bits and a group of the even-numbered bits of the received transfer data, and detect an error based on comparison with the CRC codes received by the reception unit.

5. The system according to claim 1, wherein each of the first error detection code generation unit and the second error detection code generation unit is configured to generate a parity bit, and the error detection circuit is configured to detect an error based on the parity bits.

6. The system according to claim 1, wherein
   the data reception unit further includes a processing unit configured to execute processing based on the received data, and
   if an error is detected based on the first error detection code, the second error detection code, and the transfer data, the processing unit executes no processing based on the transfer data.

7. A method of a data reception apparatus for receiving data from a data transmission unit including a first error detection code generation unit configured to generate a first error detection code based on odd-numbered bits corresponding to odd-numbered digits of transfer data, a second error detection code generation unit configured to generate a second error detection code based on even-numbered bits corresponding to even-numbered digits of the transfer data, and a transmission unit configured to transmit the first error detection code, the second error detection code, and the transfer data, the method comprising:
   receiving the transfer data, the first error detection code, and the second error detection code, and
   detecting an error based on each of a group of the odd-numbered bits of the transfer data and the first error detection code and a group of the even-numbered bits of the transfer data and the second error detection code.

8. The method according to claim 7, wherein
   the transmission unit is configured to transmit the odd-numbered bits of the transfer data and the first error detection code in synchronism with one edge of a pulse of a synchronization signal, and transmit the even-numbered bits of the transfer data and the second error detection code in synchronism with the other edge of the pulse of the synchronization signal, and the odd-numbered bits of the transfer data and the first error detection code are received in synchronism with the one edge of the pulse of the synchronization signal, and the even-numbered bits of the transfer data and the second error detection code are received in synchronism with the other edge of the pulse of the synchronization signal.

9. A method of a data transmission apparatus for transmitting data to a data reception unit including a reception circuit configured to receive transfer data, a first error detection code, and a second error detection code, and an error detection circuit configured to detect an error based on each of a group of odd-numbered bits corresponding to odd-numbered digits of the transfer data and the first error detection code and a group of even-numbered bits corresponding to even-numbered digits of the transfer data and the second error detection code, the method comprising:
 generating the first error detection code based on the odd-numbered bits of the transfer data;
 generating the second error detection code based on the even-numbered bits of the transfer data; and
 transmitting the first error detection code, the second error detection code, and the transfer data to the data reception unit.

10. The method according to claim 9, wherein
 the odd-numbered bits of the transfer data and the first error detection code are transmitted in synchronism with one edge of a pulse of a synchronization signal, and transmit the even-numbered bits of the transfer data and the second error detection code in synchronism with the other edge of the pulse of the synchronization signal, and
 the reception circuit is configured to receive the odd-numbered bits of the transfer data and the first error detection code in synchronism with the one edge of the pulse of the synchronization signal, and receive the even-numbered bits of the transfer data and the second error detection code in synchronism with the other edge of the pulse of the synchronization signal.

11. The system according to claim 1, wherein the data reception unit is a printhead.

12. The system according to claim 1, wherein the data transmission unit is a control unit of a printing apparatus.

13. The method according to claim 7, wherein the data reception apparatus is a printhead and the printhead receives the transfer data, the first error detection code, and the second error detection code, and detects an error based on each of a group of the odd-numbered bits of the transfer data and the first error detection code and a group of the even-numbered bits of the transfer data and the second error detection code.

14. The method according to claim 7, wherein the data transmission unit is a control unit of a printing apparatus.

15. The method according to claim 9, wherein the data reception unit is a printhead.

16. The method according to claim 9, wherein the transmission apparatus is a control unit of a printing apparatus and the control unit of the printing apparatus generates the first error detection code based on the odd-numbered bits of the transfer data and the second error detection code based on the even-numbered bits of the transfer data, and transmits the first error detection code, the second error detection code and the transfer data to the data reception unit.

* * * * *